(12) United States Patent
Swierk et al.

(10) Patent No.: US 11,350,058 B1
(45) Date of Patent: May 31, 2022

(54) SYSTEM AND METHOD FOR INTELLIGENT CONTEXTUAL SESSION MANAGEMENT FOR VIDEOCONFERENCING APPLICATIONS

(71) Applicant: Dell Products, LP, Round Rock, TX (US)

(72) Inventors: Todd E. Swierk, Austin, TX (US); Vivek Viswanathan Iyer, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 17/154,528

(22) Filed: Jan. 21, 2021

(51) Int. Cl.
| | |
|---|---|
| *H04N 7/15* | (2006.01) |
| *H04R 1/08* | (2006.01) |
| *G10L 19/16* | (2013.01) |
| *G06T 1/20* | (2006.01) |
| *G10L 19/22* | (2013.01) |
| *H04N 7/04* | (2006.01) |

(52) U.S. Cl.
CPC ............ *H04N 7/15* (2013.01); *G06T 1/20* (2013.01); *G10L 19/167* (2013.01); *G10L 19/22* (2013.01); *H04N 7/04* (2013.01); *H04R 1/08* (2013.01)

(58) Field of Classification Search
CPC ... H04N 7/15; H04N 7/04; H04N 7/14; H04R 1/08; G06T 1/20; G10L 19/22; G10L 19/16
USPC ............ 348/14.08–14.16; 709/204; 715/753
See application file for complete search history.

(56) References Cited

U.S. PATENT DOCUMENTS

| | | | |
|---|---|---|---|
| 8,171,151 | B2 | 5/2012 | Dunbar |
| 8,711,255 | B2 | 4/2014 | Yamashita |
| 8,780,166 | B2 | 7/2014 | Shanmukhadas |
| 9,082,391 | B2 | 7/2015 | Yermeche |
| 9,503,685 | B2 | 11/2016 | Baron, Jr. |
| 2004/0267778 | A1 | 12/2004 | Rudolph |

(Continued)

OTHER PUBLICATIONS

H. Purwins et al., "Deep Learning for Audio Signal Processing," IEEE Journal of Selected Topics of Signal Processing, vol. 13, No. 2, May 2019, pp. 206-219.

*Primary Examiner* — Melur Ramakrishnaiah
(74) *Attorney, Agent, or Firm* — Prol Intellectual Property Law, PLLC; H. Kenneth Prol

(57) ABSTRACT

An information handling system executing an intelligent collaboration contextual session management system may comprise a display screen, a speaker, a video camera, a microphone, a sensor hub detecting participation of a user in a videoconference session, and a processor to execute a multimedia multi-user collaboration application to join the videoconference session with a remotely located computing device. The processor may also input a detected user participation level into a trained neural network and output an optimized media capture instruction to the video camera predicted to adjust performance of the multimedia multi-user collaboration application to meet a preset performance benchmark value, during the videoconference session. The video camera may be configured to capture a video sample based on the optimized media capture instructions, in response to the detected user participation level, and a network interface device may be configured to transmit the captured video sample to the remotely located computing device.

20 Claims, 9 Drawing Sheets

(56) References Cited

U.S. PATENT DOCUMENTS

| | | |
|---|---|---|
| 2004/0268369 A1 | 12/2004 | Debique |
| 2006/0094001 A1 | 5/2006 | Torre |
| 2009/0323818 A1 | 12/2009 | Weiss |
| 2010/0268565 A1* | 10/2010 | Trinon ................ H04L 41/5054 709/223 |
| 2011/0074910 A1 | 3/2011 | King |
| 2011/0283203 A1 | 11/2011 | Periyannan |
| 2016/0073054 A1* | 3/2016 | Balasaygun ........ H04L 12/1813 348/14.08 |
| 2017/0134446 A1* | 5/2017 | Kitada .................... G10L 25/57 |
| 2018/0151187 A1* | 5/2018 | Sorensen .............. H04M 3/568 |
| 2018/0176508 A1* | 6/2018 | Pell ..................... H04L 65/4015 |
| 2018/0295325 A1* | 10/2018 | Breedvelt-Schouten .................... H05K 999/99 |
| 2020/0092519 A1* | 3/2020 | Shin ........................ H04N 7/152 |
| 2020/0351435 A1* | 11/2020 | Therkelsen ............ H04N 7/155 |
| 2021/0044734 A1* | 2/2021 | Tangeland ......... H04N 5/23219 |

\* cited by examiner

US 11,350,058 B1

SYSTEM AND METHOD FOR INTELLIGENT CONTEXTUAL SESSION MANAGEMENT FOR VIDEOCONFERENCING APPLICATIONS

FIELD OF THE DISCLOSURE

The present disclosure generally relates to multimedia, multi-user collaboration applications, such as videoconferencing applications. More specifically, the present disclosure relates to intelligently managing media processing pursuant to execution of such applications, based on performance metrics for an information handling system, and context factors related to a current user session within such an application.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
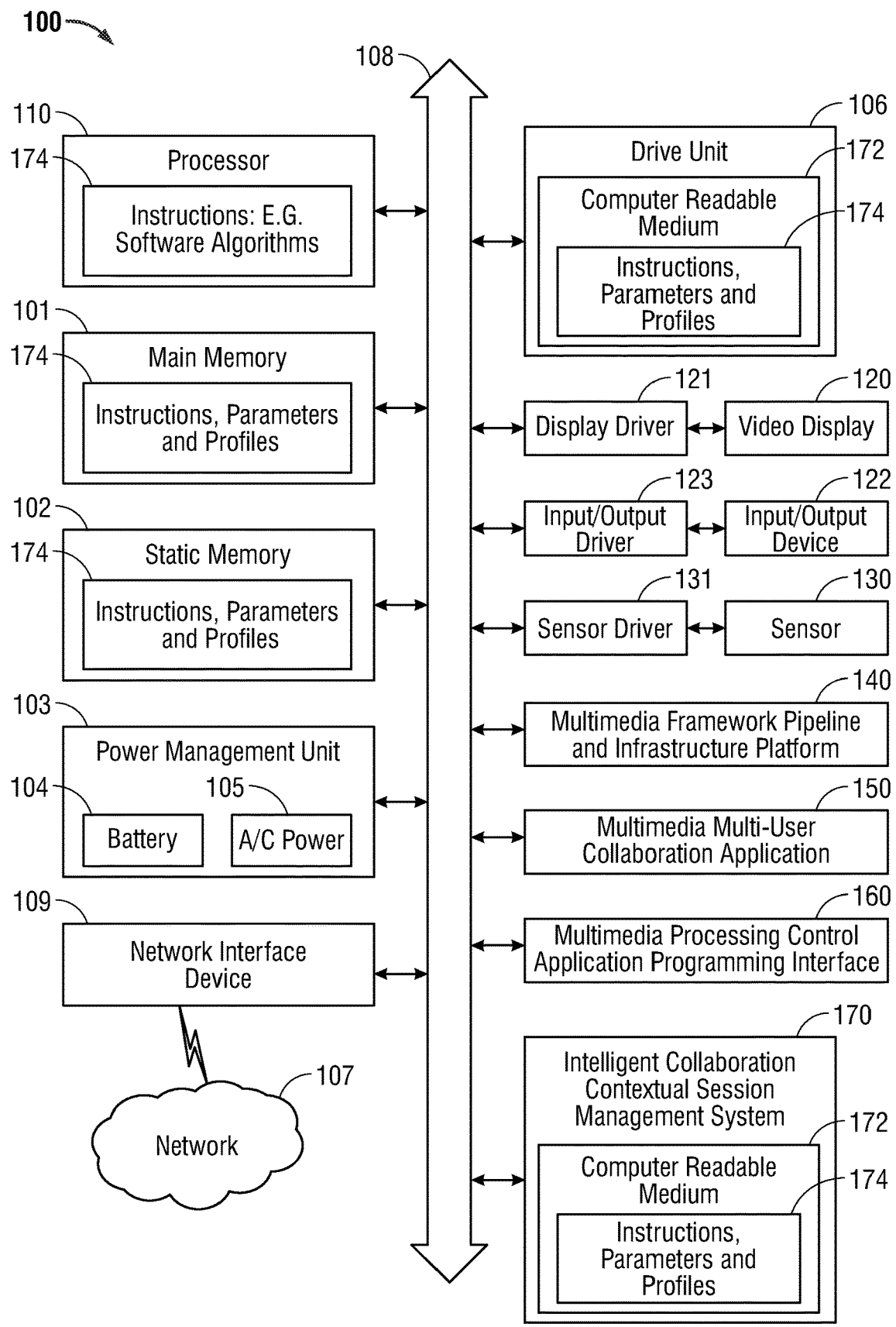
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

As working remotely has gained in popularity, so too has the prevalence of multi-employee or multi-business video conferences. Many of these video conferences (also referred to as web-conferences, online meetings, tele-video conferences, or remote conferences) may include a large number of people, sometimes exceeding 50 or 100 participants. In many cases, only one or a handful of meeting participants are actively engaged in the meeting, as presenters, or as active participants in a discussion, for example. However, most existing multimedia multi-user collaboration applications hosting such video conferences perform the same video processing methods on videos of each participant. Such processing may occur both at each individual participant's computing device, and at all other participant's computing devices, after the video of a single participant has been transmitted to the computing devices of all other participants.

These existing multimedia multi-user collaboration applications prioritize displayed video quality over most, if not all other functionality of any participant's computing devices. As a consequence, these existing multimedia multi-user collaboration applications routinely capture the richest audio and video, and perform media processing methods designed to provide the most polished video, upon display. However, this also absorbs an inordinate portion of the processing capacity for the computing device capturing the video, and the computing device that receives and plays the video.

Thus, as the number of users within a single user session of these existing multimedia multi-user collaboration applications increases, so too does the strain on the processors (e.g., of all participants) performing these video processing methods. Further, commonly only the videos of the most active participants in a large group need this type of high-level processing, or require the capture of high-quality (and thus large data streaming size) video and audio samples. This high demand on processing capacity may inhibit, or prohibit execution of other applications at any given participant's computing device or otherwise cause degradation in the information handling system performance. It may also cause the fan at any given participant's computing device to run loudly enough to interfere with the user's ability to hear and participate in the session, or interfere with audio capture of the user speaking during the session. Finally, such high demand on the processor may cause the multimedia multi-user collaboration application itself to become glitchy, freeze, or fail, as reflected by high latency, jitter, or lost-packets. A method is needed for tailoring the video capture and video processing methods at each individual computing device participating in the user session to optimize performance of both the multimedia multi-user collaboration application and other concurrently executed applications, based on performance metrics at each computing device, and on statistics describing each user's participation within the current user session.

The intelligent collaboration contextual session management system in embodiments of the present disclosure addresses this issue by training a machine-learning neural network to identify optimized media capture settings and optimized media processing settings for a variety of performance environments encountered by a single information handling system participating in multimedia multi-user collaboration application user sessions over time. In embodiments described herein, the term "media" may refer to images or video samples (e.g., compilation of several images over time) captured by a camera, audio samples captured by a microphone, or a combination of audio and video samples to form a media sample providing both audio and video. A separate neural network may be trained for each of a plurality of information handling systems in embodiments, based on performance metrics or functional capabilities unique to that information handling system. Such neural networks may operate at a transmitting information handling system that captures and transmits audio and video of a first participant of the user session, or at a receiving information handling system that receives and displays the audio and video of the first participant for viewing by a second participant of the user session. Optimized settings determined by such neural networks in embodiments may operate to decrease the processing burden placed on the CPU, GPU, or other processors and controllers (and undesirable side effects associated therewith) at either or both the transmitting information handling system and the receiving information handling system.

The intelligent collaboration contextual session management system, or portions thereof, may operate remotely from the information handling system for which the neural network is trained in some embodiments. For example, the intelligent collaboration contextual session management system may operate as part of an information handling system performance optimizer application hosted, for example, by the manufacturer of the information handling system, or managed by the information handling system user's employer or Information Technology (IT) manager. Such an information handling system performance optimizer application may operate in example embodiments in various contexts to monitor certain performance metrics at the information handling system, perform firmware and software updates, confirm security credentials and compliance, and manage user access across a plurality of information handling systems (e.g., as owned by an employer or enterprise corporation). In such embodiments, the intelligent collaboration contextual session management system may receive such performance metrics and metrics describing previous multimedia multi-user collaboration application user sessions for an information handling system via any type of network, including out-of-band communications, and communications with one or more software applications, application programming interfaces (APIs), or directly with one or more controllers or firmware in kernel mode.

The intelligent collaboration contextual session management system in embodiments may train a neural network for a transmitting information handling system to determine optimized media capture settings (e.g., audio sample bit rate, video frames per second, image resolution, etc.) and optimized media processing settings including identification of types of audio/visual (A/V) processing instructions (e.g., video processing methods such as super resolution, user framing, background application, and audio processing methods such as background noise reduction, etc.) to apply to a captured video or audio sample. Such A/V processing instruction modules may comprise code instructions or algorithms executed by a processor of the information handling system to transform a media sample data such as a video sample or audio sample through some form of A/V data processing technique. The neural network for the transmitting information handling system may also be trained in embodiments to identify an optimized type of processor capabilities available on an information handling system (e.g., central processing unit (CPU), graphics processing unit (GPU), vision processing unit (VPU), gaussian neural accelerator (GNA)) for execution of such A/V processing instruction modules, for example. Selection of a non-CPU processor may be referred to herein as "offloading," and may result in the multimedia multi-user collaboration application draining less CPU processing power in embodiments. These determinations may be made based on input values, including the performance metrics such as processing or system capabilities and applications executing at the information handling system and meeting metrics describing previous multimedia multi-user collaboration application user sessions gathered by the transmitting information handling system performance optimizer application in example embodiments.

These and other input values may be input into the neural network trained for the transmitting information handling system in such embodiments. For example, other input values may further include non-optimized or default settings for audio and video capture and for processor type, and default settings (e.g., as set by the multimedia multi-user collaboration application) for A/V processing instruction modules executed on such captured audio and video samples. The neural network may be trained for the transmitting information handling system to accurately model the relationship between media capture settings, A/V processing instruction modules applied, or offloading settings and various preset performance benchmarks for the multimedia multi-user collaboration application (e.g., as measured by various meeting metrics). Upon completion of such training, the neural network may generate one or more of an optimized media capture instruction, optimized A/V processing instruction adjustment, or optimized offload instruction predicted to cause the multimedia multi-user collaboration application to meet any and all preset performance benchmarks during future user sessions. In some embodiments described herein, the neural network trained for the transmitting information handling system may do so remotely from the transmitting information handling system engaging in such user sessions. In other embodiments described herein, the neural network may be transmitted to an agent of the intelligent collaboration contextual session management system operating at the transmitting information handling system for which the neural network has been specifically trained, and through which a user for the multimedia multi-user collaboration application may join a user session in progress.

Upon joining or starting a user session for the multimedia multi-user collaboration application in embodiments described herein, the multimedia processing control API at the transmitting information handling system may gather and transmit to the trained neural network all necessary or available inputs upon which the neural network was previously trained. For example, the multimedia processing control API in embodiments may gather current performance metrics such as processing or system capabilities and applications executing at the transmitting information handling system, meeting metrics describing the current multimedia multi-user collaboration application user session, default settings for audio and video capture at the transmitting information handling system, default settings for processor type, and default A/V processing instruction module settings set to be executed on such captured audio and video samples at the transmitting information handling system during the current user session. The trained neural network in embodiments may output optimized media capture instructions for the transmitting information handling system in some embodiments, based on these gathered inputs. For example, optimized media capture instructions for the transmitting information handling system may include instructions to decrease the bit rate at which the microphone captures audio samples, or to decrease the frames per second at which the camera captures video samples, if the transmitting information handling system user is not highly engaged (e.g., speaking often, hosting the session, or screen sharing) in the current user session. The intelligent collaboration contextual session management system at the transmitting information handling system in embodiments may then transmit the optimized media capture settings to the streaming media driver, which may direct the camera and microphone to capture video and audio samples using the optimized media capture settings determined by the neural network. The streaming data sizes for the media samples (e.g., audio samples or video samples) captured at the transmitting information handling system using these optimized settings in embodiments may be significantly smaller than streaming data sizes for media samples captured using default settings provided by the multimedia multi-user collaboration application.

The neural network trained for the transmitting information handling system in embodiments may also output optimized A/V processing instruction adjustments identifying one or more A/V processing instruction modules to execute during post-capture processing of the audio or video samples captured using the optimized capture settings (or the default capture settings in embodiments in which the neural network does not output optimized capture settings) described directly above. For example, optimized A/V processing instruction adjustments for the transmitting information handling system may include instructions to use a less complex boundary detection method than the default method when applying a background, or to encode the audio or video samples at a lower resolution than the default method, if the transmitting information handling system user is not highly engaged (e.g., speaking often, hosting the session, or screen sharing) in the current user session. Less complex methods and lower resolutions in such embodiments may be associated with lower processing requirements (e.g., processing load placed on CPU or other processors) or decreased streaming data sizes of the processed and encoded media sample that will be transmitted to a receiving information handling system. In some embodiments, the optimized A/V processing instruction adjustments for the transmitting information handling system may further include instructions to skip or remove default A/V processing instruction module settings. For example, optimized A/V processing instruction adjustments for the transmitting information handling system may include instructions to skip an A/V processing instruction for applying a virtual background. In such a way, the intelligent collaboration contextual session management system transmitting such optimized A/V processing instruction adjustments in embodiments may decrease the processing load at the transmitting information handling system during processing of the captured media samples, and decrease the streaming data size for the processed and encoded media sample transmitted to the receiving information handling system.

The neural network trained for the transmitting information handling system in embodiments may output an optimized processor setting (e.g., offload instruction) in some embodiments, based on the gathered neural network inputs. For example, such offload instructions may include an instruction to execute one or more A/V processing instruction modules at the transmitting information handling system using a non-CPU processor (e.g., GPU, VPU, GNA) in embodiments described herein. The intelligent collaboration contextual session management system of the transmitting information handling system in embodiments may transmit this instruction to the multimedia framework pipeline and infrastructure platform controlling or directing execution of such A/V processing instruction modules. By decreasing the streaming data size of the captured audio or video samples upon which such A/V processing instruction modules may be executed, the processing power required to perform such an execution at the transmitting information handling system may also markedly decrease. Further, by offloading these executions to a non-CPU processor, the undesirable side effects (e.g., video lag, glitches, slowing of peripheral applications, engaging the fan to cool the CPU) associated with over-taxing the transmitting information handling system CPU during such executions (e.g., pursuant to default or non-optimized media capture and processing settings) may be avoided.

The multimedia framework pipeline and infrastructure platform of the transmitting information handling system in embodiments may execute each of the A/V processing instruction modules set or requested by the multimedia multi-user collaboration application on the audio samples or video samples captured at the transmitting information handling system using the optimized capture settings in order to create processed, encoded media samples that combine both video and audio samples into a single file. Media samples may be referred to herein as "processed" when the video sample or audio sample upon which the media sample is created has undergone at least one A/V processing instruction, which may include an encoding process, or other audio/video processing methods (e.g., zooming, virtual background application, cropping, user framing, resolution adjustment, normalization, eye contact correction, background noise reduction, etc.).

Upon processing of media samples, the multimedia framework pipeline and infrastructure platform may transmit the processed, encoded media sample that includes video of the transmitting information handling system user to the multimedia multi-user collaboration application for the transmitting information handling system. The processed, encoded media sample may then be transmitted to other information handling systems (e.g., receiving information handling systems) in use by other participants within the current user session for the multimedia multi-user collaboration application. These receiving information handling systems may then reprocess and decode the received media sample, for playback at the displays for these receiving information handling systems. In such a way, the intelligent collaboration contextual session management system may decrease the processing burden at the transmitting information handling system capturing, processing, and transmitting media samples recording the user of the transmitting information handling system during participation in a current user session for a multimedia multi-user collaboration application.

The intelligent collaboration contextual session management system in embodiments may further operate to decrease the processing burden at an information handling system receiving, reprocessing, and decoding media samples. Such received media samples in embodiments may record users of transmitting information handling systems who may be participating in a user session of the multimedia multi-user collaboration application session along with the user of the information handling system receiving such media samples. In such embodiments, the intelligent collaboration contextual session management system may train another neural network (e.g., separate from the neural network operating at the transmitting information handling system capturing and transmitting the media samples), based on inputs specific to the receiving information handling system. Such inputs may include, for example, performance metrics such as processing or system capabilities and applications executing at the receiving information handling system, metrics describing previously executed multimedia multi-user collaboration application user sessions, default settings for processor type, and A/V processing instruction modules set to be executed on such received media samples during such previously executed user sessions. Because each of these inputs may vary between the information handling system transmitting a media sample and the receiving information handling system, each of these information handling systems may be associated with a separate neural network. The neural network trained for the receiving information handling system, may then be hosted at the information handling system performance optimizer application, or transmitted to the receiving information handling system to be executed by an agent of the intelligent collaboration contextual session management system operating thereon.

The multimedia processing control API at the receiving information handling system in embodiments may gather and transmit to the neural network, trained for the receiving information handling system, all necessary or available inputs upon which this neural network was previously trained. The neural network trained for the transmitting information handling system in embodiments may output optimized A/V processing instruction adjustments identifying one or more A/V processing instruction modules to execute during reprocessing and decoding of the media sample received from the transmitting information handling system. For example, optimized A/V processing instruction adjustments for the receiving information handling system may include instructions to apply a less complex resolution adjustment method (e.g., super resolution). Lower resolutions in such embodiments may be associated with lower processing requirements (e.g., processing load placed on CPU or other processors) at the receiving information handling system. In such a way, the intelligent collaboration contextual session management system transmitting such optimized A/V processing instruction adjustments in embodiments may decrease the processing load at the receiving information handling system during reprocessing or decoding of the received media samples. Further, in embodiments in which the streaming data size of the received media sample has been minimized by an agent of the intelligent collaboration contextual session management system operating at the transmitting information handling system, the decreased streaming data size for the received media sample may further decrease the processing load at the receiving information handling system during reprocessing or decoding of the received media sample.

The neural network trained for the receiving information handling system in embodiments may output an optimized processor setting (e.g., offload instruction) for the receiving information handling system in some embodiments, based on gathered inputs. The intelligent collaboration contextual session management system in embodiments may transmit this instruction to the multimedia framework pipeline and infrastructure platform controlling or directing execution of such A/V processing instruction modules. By offloading these executions to a non-CPU processor, the undesirable side effects (e.g., video lag, glitches, slowing of peripheral applications, engaging the fan to cool the CPU) associated with over-taxing the CPU during such executions (e.g., pursuant to default or non-optimized media capture and processing settings) may be avoided at both or either of the transmitting and receiving information handling systems in embodiments described herein.

Upon reprocessing or decoding of received media samples, the multimedia framework pipeline and infrastructure platform for the receiving information handling system may direct display of the reprocessed and decoded video of the transmitting information handling system user for viewing by the user of the receiving information handling system. In such a way, the intelligent collaboration contextual session management system may decrease the processing burden at the receiving information handling system during reprocessing and decoding of received media samples recording the user of the transmitting information handling system during participation of both users in a current user session for a multimedia multi-user collaboration application. By decreasing processor burden at the receiving information handling system, transmitting information handling system, or both, the intelligent collaboration contextual session management system may optimize performance of the multimedia multi-user collaboration application and other concurrently running applications at a plurality of information handling systems engaged in a single user session.

Turning now to the figures, FIG. 1 illustrates an information handling system 100 similar to information handling systems according to several aspects of the present disclosure. As described herein, the intelligent collaboration contextual session management system 170 in an embodiment may operate to decrease the processing burden associated with the capture, processing, encoding, and transmission of a media sample (e.g., including audio or video) from a transmitting information handling system to a receiving information handling system. Further, the intelligent collaboration contextual session management system 170 in an embodiment may operate to decrease the processing burden associated with the receipt, reprocessing, decoding, and display of such a media sample, as received from the transmitting information handling system at a receiving information handling system. The information handling system 100 described with reference to FIG. 1 may represent a transmitting information handling system or a receiving information handling system in various embodiments. In still other embodiments, information handling system 100 may operate as both a transmitting and a receiving information handling system, as may be the case for an information handling system transmitting video of one participant user while simultaneously executing code instructions for the multimedia multi-user collaboration application 150 to display videos of other participants within a shared user session.

In yet another embodiment, the information handling system 100 may operate remotely from all transmitting or receiving information handling systems executing code instructions of the multimedia multi-user collaboration application 150 to participate within a user session. For example, the intelligent collaboration contextual session management system 170 may operate on a server, blade, rack, or cloud-based network maintained and controlled by the manufacturer of several information handling systems, or managed by an employer or enterprise owner of several information handling systems. In such an embodiment, the information handling system 100 may operate within one of these servers, blades, racks, or across various nodes of a cloud-based network to monitor certain performance metrics at each of the plurality of such information handling systems, perform firmware and software updates, confirm security credentials and compliance, and manage user access across the plurality of information handling systems (e.g., as owned by an employer or enterprise corporation). In such an embodiment, each of the plurality of transmitting and receiving information handling systems participating within a user session of the multimedia multi-user collaboration application 150 may incorporate an agent or API for the intelligent collaboration contextual session management system 170.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a control system, a camera, a scanner, a printer, a pager, a personal trusted device, a web appliance, or any other suitable machine capable of executing a set of instructions (sequential or otherwise) that specify actions to be taken by that machine, and may vary in size, shape, performance, price, and functionality.

The information handling system may include memory (volatile (e.g., random-access memory, etc.), nonvolatile (read-only memory, flash memory etc.) or any combination thereof), one or more processing resources, such as a central processing unit (CPU), a graphics processing unit (GPU), a vision processing unit (VPU), a Gaussian neural accelerator (GNA), hardware or software control logic, or any combination thereof. Additional components of the information handling system 100 may include one or more storage devices, one or more communications ports for communicating with external devices, as well as various input and output (I/O) devices 122, such as a keyboard, a mouse, a headset device incorporating one or more microphones and one or more speakers, a touchpad, or any combination thereof. The information handling system 100 may also include various sensors 130 (e.g., Hall effect positional sensors, hinge rotation sensors, geographic locations sensors such as GPS systems, light sensors, time of flight sensors, infrared sensors, etc.). A power management unit 103 supplying power to the information handling system 100, via a battery 104 or an alternating current (A/C) power adapter 105 may also be included within information handling system 100, as well as one or more buses operable to transmit communications between the various hardware components. The information handling system 100 may further include a video display 120. The video display 120 in an embodiment may function as a liquid crystal display (LCD), an organic light emitting diode (OLED), a flat panel display, or a solid-state display. Portions of an information handling system 100 may themselves be considered information handling systems 100.

In an example embodiment, the information handling system 100 may include a laptop or desktop system that executes the multimedia multi-user collaboration application 150 that may operate as a videoconferencing application. The multimedia multi-user collaboration application 150 may include any computer code that is executed by a processor 110, or other processors of the information handling system 100 in order to decrease the processing load generated during capture, processing, and encoding of media samples for transmission, or during reprocessing, decoding, or display of received media samples, pursuant to execution of the multimedia multi-user collaboration application 150. The multimedia framework pipeline and infrastructure platform 140 in an embodiment may execute code instructions to direct execution of specific processing and encoding of media samples for transmission, or direct execution of reprocessing, and decoding of received media samples.

The multimedia multi-user collaboration application 150 in an embodiment may transmit to the multimedia framework pipeline and infrastructure platform 140 default settings for such processing, reprocessing, encoding, decoding, capture, and display (e.g., via bus 108). Such default settings may not be optimized, and may result in unnecessarily high processing burden at the information handling system 100. The intelligent collaboration contextual session management system 170 in an embodiment may operate to determine optimized settings (e.g., optimized media capture instructions) at a transmitting information handling system (e.g., 100) for audio or video capture, optimized settings for execution of various A/V processing instruction modules (e.g., optimized A/V processing instruction adjustments) on audio or video samples captured using those optimized settings, or optimized settings (e.g., offload instructions) for the type of processor used to perform such executions, for example. In another example embodiment, the intelligent collaboration contextual session management system 170 may operate to determine optimized settings at a receiving information handling system (e.g., 100) for execution of various A/V processing instruction modules (e.g., optimized A/V processing instruction adjustments) on media samples (e.g., audio samples, video samples, or a combination of both) received from a transmitting information handling system during reprocessing and decoding of such media samples, or optimized settings (e.g., offload instructions) for the type of process used to perform such executions. The intelligent collaboration contextual session management system 170 in an embodiment may select changes to or modify various settings of various A/V processing instruction modules among plural sets of media samples received from a transmitting information handling system during a video conference call in another embodiment.

The intelligent collaboration contextual session management system 170 in an embodiment may include code instructions 174 for training a neural network, or for executing a neural network. In an embodiment in which the intelligent collaboration contextual session management system 170 operates to train a neural network, the information handling system 100 may represent the transmitting information handling system, the receiving information handling system, both of these, or an information handling system located remotely from both the transmitting and receiving information handling systems. The intelligent collaboration contextual session management system 170 in each of these embodiments may gather various input values from a plurality of information handling systems executing the multimedia multi-user collaboration application (e.g., 150) over time in order to determine optimized settings for each of the plurality of information handling systems to decrease processing burden at each information handling system.

The multimedia processing control API 160 in an embodiment may operate to facilitate communication between various applications, controllers, and drivers of the information handling system 100 in an embodiment. For example, in an embodiment in which the neural network is trained remotely from the information handling system 100 (e.g., the information handling system represents a receiving information handling system or transmitting information handling system), the multimedia processing control API 160 may operate to gather input values for the neural network from the input/output driver 123, sensor driver 131, multimedia framework pipeline and infrastructure platform 140, processor 110, main memory 101, power management unit 103, network interface device 109, or multimedia multi-user collaboration application 150 (e.g., via bus 108). The multimedia processing control API 160 in such an embodiment may transmit such gathered inputs to the remotely located system for training the neural network via network interface device 109 and network 107 in embodiments in which the neural network is trained remotely from the information handling system 100. The trained neural network may then be executed in the same remote location, or may be transmitted to the information handling system 100 via network 107 for storage in main memory 101, static memory 102, or drive unit 106 (e.g., as instructions 174). In an embodiment in which the neural network is trained at the information handling system 100, the multimedia processing control API 160 may transmit the gathered inputs to the intelligent collaboration contextual session management system 170 operating at the information handling system 100 (e.g., as instructions 174).

Upon execution of the trained neural network (e.g., as instructions 174) in an embodiment, and during execution of a user session via the multimedia multi-user collaboration application 150, the multimedia processing control API 160 may gather current input values for the trained neural network in a similar manner as the training session. The multimedia processing control API 160 in such an embodiment may transmit such gathered inputs to the intelligent collaboration contextual session management system (or agent) 170 executing the trained neural network (e.g., instructions 174).

The trained neural network may then output optimized media capture instructions, optimized A/V processing instruction adjustments, or optimized offload instructions to various drivers or applications via the multimedia processing control API 160. For example, an optimized media capture instruction may be transmitted (e.g., via bus 108) to the input/output driver 123 in an embodiment in which the input/output device 122 is a camera or microphone. In such an example embodiment, the input/output driver 123 may be a streaming media driver, a camera driver, one of a plurality of camera drivers, or an audio driver for a microphone. As another example, an optimized A/V processing instruction adjustment or an optimized offload instruction may be transmitted (e.g., via bus 108) to the input/output driver 123 or to the multimedia framework pipeline and infrastructure platform 140. The trained neural network may perform such operations in an embodiment in which information handling system 100 is a transmitting information handling system, or in which information handling system 100 is a receiving information handling system.

In an embodiment in which the information handling system 100 represents a media capturing and transmitting information handling system, a camera operating as the input/output device 122 may capture video pursuant to the optimized media capture settings received at the streaming media driver or video driver operating as input/output driver 123. In another example of such an embodiment, a microphone operating as the input/output device 122 may capture audio pursuant to the optimized media capture settings received at the streaming media driver or audio driver operating as input/output driver 123. The video samples or audio samples so captured in an embodiment may be transmitted to the multimedia framework pipeline and infrastructure platform 140, which may apply one or more A/V processing instruction modules defined by the received optimized A/V processing instruction adjustments to the captured video or audio samples. The multimedia framework pipeline and infrastructure platform 140 in such an embodiment may engage the processor 110 (e.g., CPU, GPU, VPU, GNA) identified within the offload instructions to execute such A/V processing instruction modules on the captured video or audio samples to generate a processed, encoded media sample combining the video and audio samples. By capturing and processing the audio and video samples using these optimized instructions, the intelligent collaboration contextual session management system 170 may direct various components of the transmitting information handling system (e.g., 100) to use less CPU (e.g., 110) resources during such processing, and to decrease the streaming data size for the resulting media sample. The multimedia multi-user collaboration application 150 may then direct transmission of the processed, encoded media sample to other information handling systems operated by other participants of the user session for the multimedia multi-user collaboration application 150, via network interface device 109 and network 107.

In an embodiment in which the information handling system 100 represents a media playing and receiving information handling system, the network interface device 109 may receive a processed, encoded media sample from another information handling system operated by another participant of the user session for the multimedia multi-user collaboration application 150, via network 107. For example, the multimedia multi-user collaboration application 150 may access streaming media samples generated at an information handling system other than information handling system 100 at a Unique Resource Identifier (URI) within network 107, through the network interface device 109 and bus 108. The media samples so received in an embodiment may be transmitted to the multimedia framework pipeline and infrastructure platform 140, which may apply one or more A/V processing instruction modules defined by the received optimized A/V processing instruction adjustments to the received media sample. The multimedia framework pipeline and infrastructure platform 140 in such an embodiment may engage the processor 110 (e.g., CPU, GPU, VPU, GNA) identified within the offload instructions to execute such A/V processing instruction modules on the received media sample to generate a reprocessed, decoded media sample. By reprocessing and decoding the received media sample using these optimized instructions, the intelligent collaboration contextual session management system 170 may direct various components of the receiving information handling system (e.g., 100) to use less CPU (e.g., 110) resources during such reprocessing and decoding. The multimedia multi-user collaboration application 150 may then direct playback of the reprocessed, decoded media sample via the display driver 121 and the video display 120.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

Information handling system 100 may include devices or modules that embody one or more of the devices or execute instructions for the one or more systems and modules described herein, and operates to perform one or more of the methods described herein. The information handling system 100 may execute code instructions 174 that may operate on servers or systems, remote data centers, or on-box in individual client information handling systems according to various embodiments herein. In some embodiments, it is understood any or all portions of code instructions 174 may operate on a plurality of information handling systems 100.

The information handling system 100 may include a processor 110 such as a CPU, GPU, VPU, GNA, control logic or some combination of the same. Any of the processing resources may operate to execute code that is either firmware or software code. Specifically, the processor 110 may operate to execute code instructions of firmware for the input/output driver 123 in an embodiment. Moreover, the information handling system 100 may include memory such as main memory 101, static memory 102, or other memory of computer readable medium 172 storing instructions 174 of the intelligent collaboration contextual session management system 170 for optimizing execution of a user session of the multimedia multi-user collaboration application 150, and drive unit 106 (volatile (e.g., random-access memory, etc.), nonvolatile memory (read-only memory, flash memory etc.) or any combination thereof. A processor 110 may further provide the information handling system with a system clock for which a time of day clock may be tracked along with any location detector such as global positioning system or in coordination with a network interface device 109 connecting to one or more networks 107. The information handling system 100 may also include one or more buses 108 operable to transmit communications between the various hardware components such as any combination of various input and output (I/O) devices.

The network interface device 109 may provide wired or wireless connectivity to a network 107, e.g., a wide area network (WAN), a local area network (LAN), wireless local area network (WLAN), a wireless personal area network (WPAN), a wireless wide area network (WWAN), or other network. Connectivity may be via wired or wireless connection. The network interface device 109 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. In some aspects of the present disclosure, one network interface device 109 may operate two or more wireless links. Network interface device 109 may also connect to any combination of macro-cellular wireless connections including 2G, 2.5G, 3G, 4G, 5G or the like. Utilization of radiofrequency communication bands according to several example embodiments of the present disclosure may include bands used with the WLAN standards and WWAN carriers, which may operate in both licensed and unlicensed spectrums.

In some embodiments, software, firmware, dedicated hardware implementations such as application specific integrated circuits, programmable logic arrays and other hardware devices may be constructed to implement one or more of some systems and methods described herein. For example, some embodiments may include operation of embedded controllers for various applications or input/output devices 122.

Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 174 or receives and executes instructions, parameters, and profiles 174 responsive to a propagated signal, so that a device connected to a network 107 may communicate voice, video or data over the network 107. Further, the instructions 174 may be transmitted or received over the network 107 via the network interface device 109.

The information handling system 100 may include a set of instructions 174 that may be executed to cause the computer system to perform any one or more of the methods or computer-based functions disclosed herein. As an example, instructions 174 may execute an intelligent collaboration contextual session management system 170, software agents, or other aspects or components. Various software modules comprising application instructions 174 may be coordinated by an operating system (OS), and/or via an application programming interface (API). An example operating system may include Windows®, Android®, and other OS types. Example APIs may include Win 32, Core Java API, or Android APIs.

The disk drive unit 106 and the intelligent collaboration contextual session management system 170 may include a computer-readable medium 172 in which one or more sets of instructions 174 such as software may be embedded. Similarly, main memory 101 and static memory 102 may also contain a computer-readable medium for storage of one or more sets of instructions, parameters, or profiles 174. The disk drive unit 106 and static memory 102 may also contain space for data storage. Further, the instructions 174 may embody one or more of the methods or logic as described herein. For example, instructions relating to the intelligent collaboration contextual session management system 170, code instructions of a trained neural network, software algorithms, processes, and/or methods may be stored here. In a particular embodiment, the instructions, parameters, and profiles 174 may reside completely, or at least partially, within the main memory 101, the static memory 102, and/or within the disk drive 106 during execution by the processor 110 of information handling system 100. As explained, some of or all the intelligent collaboration contextual session management system 170 may be executed locally or remotely. The main memory 101 and the processor 110 also may include computer-readable media.

Main memory 101 may contain computer-readable medium, such as RAM in an example embodiment. An example of main memory 101 includes random access memory (RAM) such as static RAM (SRAM), dynamic RAM (DRAM), non-volatile RAM (NV-RAM), or the like, read only memory (ROM), another type of memory, or a combination thereof. Static memory 102 may contain computer-readable medium (not shown), such as NOR or NAND flash memory in some example embodiments. The intelligent collaboration contextual session management system 170 may be stored in static memory 102, or the drive unit 106 on a computer-readable medium 172 such as a flash memory or magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may further include a power management unit (PMU) 103 (a.k.a. a power supply unit (PSU)). The PMU 103 may manage the power provided to the components of the information handling system 100 such as the processor 110 (e.g., CPU, GPU, VPU, GNA, etc.), a cooling system such as a bank of fans, one or more drive units 106, the video/graphic display device 120, and other components that may require power when a power button has been actuated by a user. In an embodiment, the PMU 103 may be electrically coupled to the bus 108 to provide this power. The PMU 103 may regulate power from a power source such as a battery 104 or A/C power adapter 105. In an embodiment, the battery 104 may be charged via the A/C power adapter 105 and provide power the to the components of the information handling system 100 when A/C power from the A/C power adapter 105 is removed.

The information handling system 100 may also include the intelligent collaboration contextual session management system 170 that may be operably connected to the bus 108. The intelligent collaboration contextual session management system 170 computer readable medium 172 may also contain space for data storage. The intelligent collaboration contextual session management system 170 may, according to the present description, perform tasks related to optimizing capture, processing, encoding, reprocessing, decoding, and playback of media samples captured or played back during execution of a user session of the multimedia multi-user collaboration application 150. The intelligent collaboration contextual session management system 170 in an embodiment may execute code instructions of a trained neural network to determine an output for optimized media capture settings, optimized A/V processing instruction adjustments, or offload instructions for achieving this goal. In such an embodiment, the intelligent collaboration contextual session management system 170 may have a convolutional neural network that is trained by receiving, as training input, performance metrics for a plurality of information handling systems, including information handling system 100, and session metrics describing user sessions of the multimedia multi-user collaboration application 150 previously executed across such a plurality of information handling systems.

In an embodiment, the intelligent collaboration contextual session management system 170 may be code instructions and operate with the main memory 101, the processor 110, the multimedia processing control API 160, various embedded controllers and the NID 109 via bus 108, and several forms of communication may be used, including ACPI, SMBus, a 24 MHZ BFSK-coded transmission channel, or shared memory. Driver software, firmware, controllers, and the like may communicate with applications on the information handling system 100.

Keyboard or touchpad driver software, firmware, controllers and the like may communicate with applications on the information handling system 100, for example via the input/output driver 123 or the sensor driver 131. Similarly, video display driver software, firmware, controllers and the like may communicate with applications on the information handling system 100, for example, via the display driver 121. In other embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module may include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module may also include a combination of the foregoing examples of hardware or software. In an embodiment an information handling system 100 may include an integrated circuit or a board-level product having portions thereof that may also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another may communicate directly or indirectly through one or more intermediaries.

Figure 2:
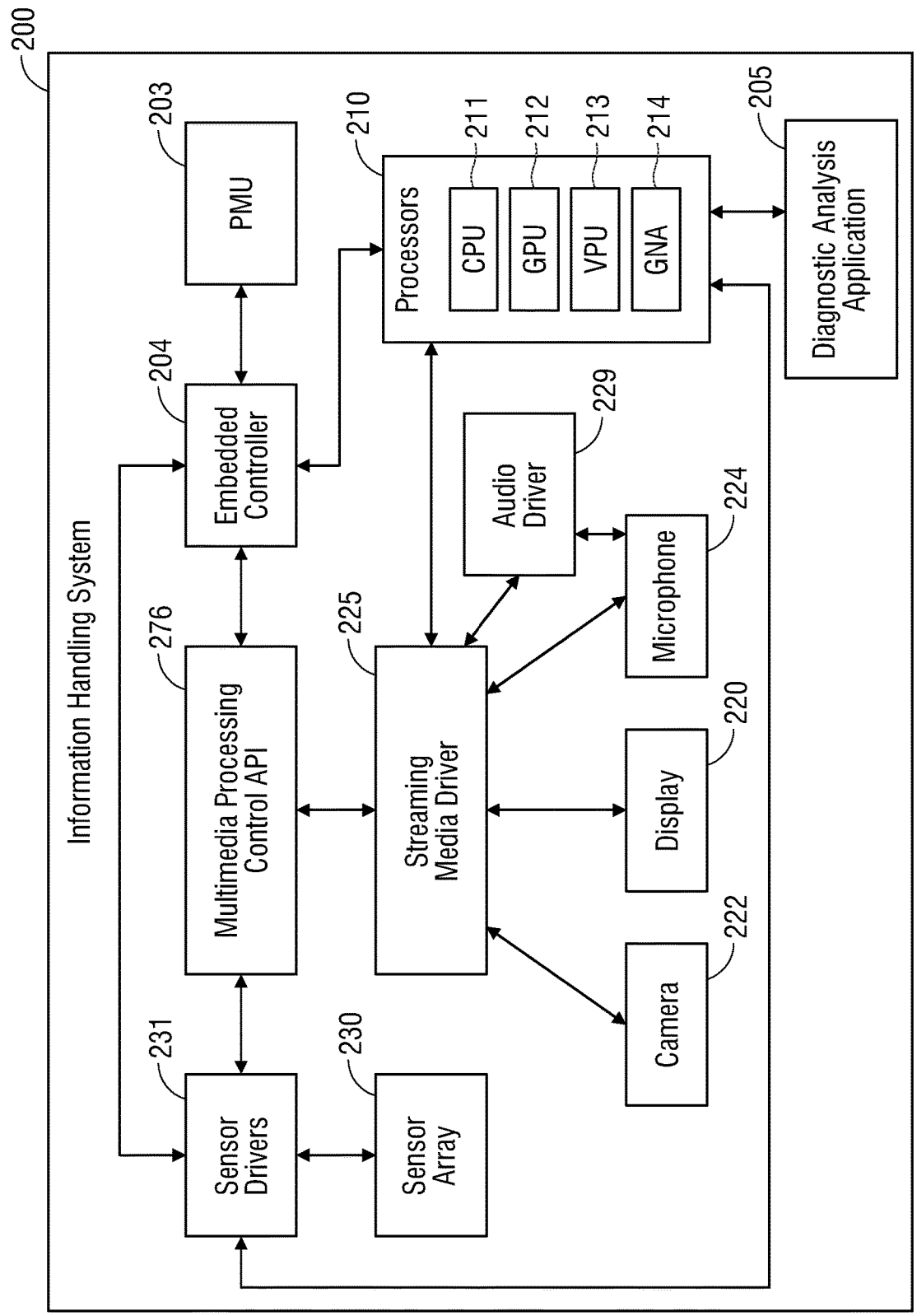
FIG. 2 is a block diagram illustrating various drivers and controllers in communication with a plurality of peripheral devices of an information handling system according to an embodiment of the present disclosure.

FIG. 2 is a block diagram illustrating various drivers and controllers in communication with a plurality of peripheral devices, software applications, and one or more processors according to an embodiment of the present disclosure. As described herein, the intelligent collaboration contextual session management system may optimize various settings for peripheral devices used in the capture of media samples played during user sessions for a multimedia multi-user collaboration application. The intelligent collaboration contextual session management system may modify media capture settings, A/V processing instruction modules applied to such captured media samples, or the type of processor used to perform such A/V processing instruction modules in order to optimize performance of the multimedia multi-user collaboration application on one or more information handling systems in an embodiment.

A neural network of the intelligent collaboration contextual session management system in an embodiment may make such optimization determinations for each individual information handling system (e.g., 200) separately. Such a determination may be made based upon a plurality of inputs describing hardware and software capabilities and performance metrics of the information handling system at issue, default media capture instructions and default A/V processing instruction module settings generated by the multimedia multi-user collaboration application, various sensor readings taken at the information handling system, and meeting metrics describing user participation and performance of the multimedia multi-user collaboration application.

These neural network input values may be gathered from a plurality of sensors, peripheral devices, and diagnostic applications. For example, hardware performance metrics describing total processing load at one or more processors 210 may be gathered via an embedded controller 204 in an embodiment. The embedded controller 204 may also gather information describing state of charge for a power management unit 203, which may include a battery and an AC adapter, as described with reference to FIG. 1. Such state of charge information may be gathered by the embedded controller 204 in an embodiment while the information handling system 200 is operating solely on battery power, and when the PMU 203 is receiving power via the AC adapter. The embedded controller 204 in an embodiment may gather such metrics through direct communication with the processor 210 (e.g., CPU, GPU, VPU, GNA, etc.) and with the power management unit (PMU) 203. In some embodiments, such communication may occur in kernel mode.

As described in greater detail with reference to FIG. 5, the intelligent collaboration contextual session management system may be integrated, in whole or in part, in some embodiments within an information handling system performance optimizer application located remotely from the information handling system 200. In such an embodiment, the information handling system performance optimizer application may operate to manage security credentials, connectivity credentials, performance optimization, software updates, and other various routine computing maintenance tasks for a plurality of information handling systems (e.g., including 200) owned by an enterprise business or produced by a single manufacturer. The Dell® Optimizer® software application is one example of such an information handling system performance optimizer application. The information handling system performance optimizer application in such an embodiment may communicate with the embedded controller 204 to receive high-level hardware performance metrics from each of the plurality of information handling systems (e.g., including 200) it manages during routine out-of-band communications between the information handling system performance optimizer application and all managed information handling systems. Such out-of-band communications with the embedded controller 204 in an embodiment may be used to check security credentials or performance statistics for the information handling systems (e.g., 200), or to push software or firmware updates to the information handling systems, for example. During such routine maintenance, the information handling system performance optimizer application may accumulate, sort, and analyze all performance metrics received from all managed information handling systems (e.g., 200), including processing load across all available processors 210 (e.g., CPU, GPU, VPU, GNA), default settings associating specific processors (e.g., 210) with specific tasks, or state of remaining charge of the battery incorporated within the PMU 203, for example. Out-of-band communications initiated in such a way between the embedded controller 204 and the information handling system performance optimizer application may be via a wireless network such as Wi-Fi or cellular, or via wired connection. Such out-of-band communications operate without need for Operating System intervention or function and may operate behind the scenes to ensure optimized function for managed information handling systems.

As another example of gathering inputs for a neural network of the intelligent collaboration contextual session management system, software performance metrics may be generated at a diagnostic analysis application 205, based at least in part on communication between the diagnostic analysis application 205 and the processor 210. Such a diagnostic analysis application 205 may operate to gather metrics describing CPU usage or load, as well as a breakdown of the CPU usage attributable to each of a plurality of applications (e.g., including a multimedia multi-user collaboration application) running via the operating system of the information handling system 200. In some embodiments, the diagnostic analysis application 205 may provide similar metrics for other types of processors for the information handling system, including, for example, a graphics processing unit (GPU), vision processing unit (VPU), or gaussian neural accelerator (GNA). One example of such a diagnostic analysis application 205 in an embodiment may include the Microsoft® Diagnostic Data Viewer® software application. As described in greater detail with respect to FIG. 5, these software performance metrics may be generated at the diagnostic analysis application 205 and transmitted to the neural network of the intelligent collaboration contextual session management system via multimedia processing controller API 276.

In yet another example of gathering inputs for a neural network of the intelligent collaboration contextual session management system, various sensor readings may be taken by the information handling system 200 and communicated to the intelligent collaboration contextual session management system. More specifically, the information handling system 200 may include one or more sensors within a sensor array 230. Such sensors may include, for example, a configuration sensor (e.g., a hall effect sensor or hinge rotation sensor, accelerometer, gyroscope, orientation sensor, light sensors, IR cameras, etc.) capable of detecting a current configuration base portion or display portion of a laptop or tablet information handling system (e.g., 200). For example, such a configuration sensor may be capable of identifying whether a convertible laptop or dual tablet information handling system (e.g., 200) is placed in a closed, open clamshell, tablet, or tent configuration.

Other examples of sensors within the sensor array 230 may include light sensors, infrared (IR) cameras, or geographic position sensors (e.g., GPS units). In some embodiments, one or more modules of the network interface device described with reference to FIG. 1 may constitute one of the sensors within the sensor array 230. For example, an antenna front end system of the network interface device may operate to determine GPS coordinates based on connection to one or more Wi-Fi networks or cellular networks. The GPS coordinates of the information handling system 200 and identification of one or more Wi-Fi networks or cellular networks to which the information handling system 200 connects may constitute sensor readings gathered at the sensor drivers 231 in an embodiment. All sensor readings from sensors within the sensor array 230 in an embodiment may be transmitted to the sensor drivers 231. As described in greater detail with respect to FIG. 5, these sensor readings may be transmitted from the sensor drivers 231 to the neural network of the intelligent collaboration contextual session management system via the processor 210 and a multimedia processing controller API 276.

In still another example of gathering inputs for a neural network of the intelligent collaboration contextual session management system, default media capture instructions and default A/V processing instruction module settings may be gathered via a streaming media driver 225 and transmitted to the intelligent collaboration contextual session management system. Default media capture instructions in an embodiment may be generated by the multimedia multi-user collaboration application, or may be preset by the manufacturer of the camera, microphone, or information handling system 200. It is contemplated that any media capture instructions directing the capture by the camera of images or video or directing the capture by the microphone of audio that do not constitute optimized media capture instructions generated based on the output of the neural network described herein may constitute default media capture instructions. Such default media capture instructions and optimized media capture instructions may dictate the method by which such audio, image, and video samples are captured. For example, media capture instructions may identify the frames per second at which the camera 222 may capture images for generation of a video, the resolution at which the camera captures and stores such images, the number of key frames in each preset time period, zoom settings, pan settings, or instructions to center the captured image around an identified object. As another example, media capture instructions may identify the bit rate at which the microphone 224 records and saves captured audio samples.

It is contemplated that the information handling system 200 may include a plurality of cameras (e.g., one camera for each of a plurality of videoconferencing displays oriented at different angles to a user), a plurality of displays (e.g., 220), and a plurality of microphones 224. The streaming media driver 225 in an embodiment may be capable of gathering the default or current media capture settings pursuant to which the camera 222 or microphone 224 are capturing images and audio, respectively. The streaming media driver 225 may also gather audio samples recorded at the microphone 224 as another input into the neural network. For example, such audio samples may be used in some embodiments in order to determine the frequency with which the user of the information handling system 200 is talking during a user session of the multimedia multi-user collaboration application. Such a frequency may be input into the neural network in embodiments to gauge user participation in the current user session, for example.

In some embodiments, default media capture instructions may be stored at the streaming media driver 225, which may operate to direct operation of the camera 222 or microphone 224. As described in greater detail with respect to FIG. 5, these default media capture instructions may be transmitted from the streaming media driver 225 to the neural network of the intelligent collaboration contextual session management system via multimedia processing controller API 276.

Upon determination of optimized media capture instructions, offload instructions, or A/V processing instruction adjustments via the neural network of the intelligent collaboration contextual session management system, these optimized media capture instructions may be transmitted to various components of the information handling system 200. For example, as described in greater detail with respect to FIG. 5, the intelligent collaboration contextual session management system may transmit the optimized media capture instructions, offload instructions or optimized A/V processing instruction adjustments generated as an output of the neural network to a multimedia processing control API 276. Such a multimedia processing control API 276 in an embodiment may transmit the optimized media capture instructions to the streaming media driver 225 in an embodiment.

The streaming media driver 225 in an embodiment may direct the operation of the camera 222 and the microphone 224 such that media (e.g., images, video samples, audio samples) is captured according to the optimized media capture instructions. For example, the streaming media driver 225 in an embodiment may direct the camera 222 to capture images and generate video samples having the frames per second, zoom settings, pan settings, or number of key frames defined by the optimized media capture instructions. As another example, the streaming media driver 225 in an embodiment may direct the microphone 224 to capture and generate audio samples having the bitrate defined by the optimized media capture instructions. In such a way, the intelligent collaboration contextual session management system in an embodiment may optimize capture of media samples to optimize performance of the multimedia multi-user collaboration application.

Figure 3:
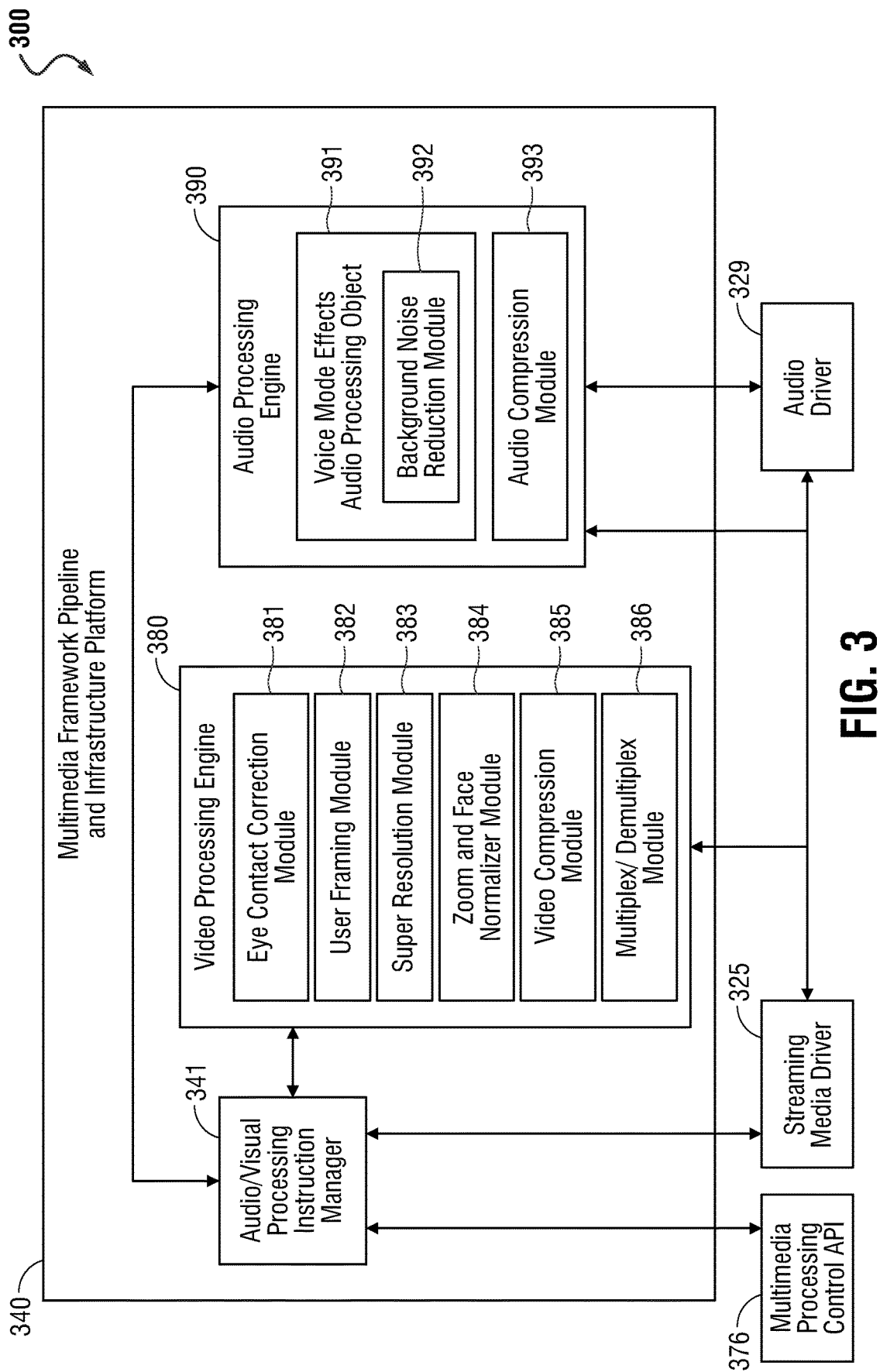
FIG. 3 is a block diagram illustrating a multimedia framework pipeline and infrastructure platform of an information handling system according to an embodiment of the present disclosure.

FIG. 3 is a block diagram illustrating a multimedia framework pipeline and infrastructure platform in communication with a plurality of drivers in order to process received media samples according to an embodiment of the present disclosure. As described herein, the intelligent collaboration contextual session management system may optimize various settings for processing of media samples captured at or received by an information handling system, during execution of user sessions for a multimedia multi-user collaboration application. The intelligent collaboration contextual session management system may optimize such settings in order to optimize performance of the multimedia multi-user collaboration application in an embodiment.

The multimedia framework pipeline and infrastructure platform 340 may process media samples captured at the information handling system executing the multimedia framework pipeline and infrastructure platform 340 in one aspect of an embodiment. An example of such a multimedia framework pipeline and infrastructure platform 340 may include the Microsoft® Media Foundation Platform® for Windows®. The multimedia framework pipeline and infrastructure platform 340 in an embodiment may manage audio and video playback quality, interoperability, content protection, and digital rights management. The multimedia framework pipeline and infrastructure platform 340 may operate to retrieve audio and video samples from a media source, perform one or more processing methods on the retrieved audio and video samples, multiplex the audio and video samples together to form a processed media sample, and transmit the processed media sample to a media sink.

The multimedia framework pipeline and infrastructure platform 340 in an embodiment may include an audio/visual (A/V) processing instruction manager 341, a video processing engine 380, and an audio processing engine 390. The video processing engine 380 and audio processing engine 390 may each perform A/V processing methods or algorithms to transform media samples. Several of such methods may be performed serially to transform a single media sample in an embodiment, such as via a chaining algorithm. The A/V processing instruction manager 341 in an embodiment may schedule or otherwise management performance of each of these methods, in turn.

In one aspect of an embodiment, a camera or microphone operably connected to the information handling system 300 may operate as the media source. In such an embodiment, the A/V processing instruction manager 341 in an embodiment may operate to retrieve a media sample from a media source, based on a media capture instruction. The A/V processing instruction manager 341 may transmit a media capture instruction to the streaming media driver 325 in an embodiment. As described in greater detail with respect to FIG. 5, the multimedia framework pipeline and infrastructure platform 340 may also be in communication with the multimedia multi-user collaboration application and a multimedia processing control API 376. Via such communications, the multimedia framework pipeline and infrastructure platform 340 may receive default media capture instructions from the multimedia multi-user collaboration application. The multimedia framework pipeline and infrastructure platform 340 may also receive optimized media capture instructions from the trained intelligent collaboration contextual session management system via the multimedia processing control API 376. As such, the media capture instructions communicated from the A/V processing instruction manager 341 to the streaming media driver 325 in an embodiment may include default media capture instructions or optimized media capture instructions when the trained intelligent collaboration contextual session management system is operating to improve information handling system performance.

The streaming media driver 324 in such an embodiment may receive video or audio samples captured by peripheral cameras or microphones in communication therewith, according to default or optimized media capture instructions, as described with reference to FIG. 2. In another embodiment, the audio driver 329 may receive audio samples captured by a microphone in communication therewith, according to such received media capture instructions. In such an embodiment, the audio driver 329 may operate as a mini-driver or child device to the parent device streaming media driver 324. The streaming media driver 325 may be in communication with the A/V processing instruction manager 341 via one or more ports (e.g., as described in greater detail with respect to the device proxy 442 of FIG. 4) such that video or audio samples received by the streaming media driver 325 may be transmitted to the A/V processing instruction manager 341 in an embodiment. The audio driver 329 may be in communication with the A/V processing instruction manager 341 such that audio samples received by the audio driver 329 may be transmitted to the A/V processing instruction manager 341 (e.g., via the audio processing engine 390, or via the streaming media driver 325) in an embodiment. In such a way, the A/V processing instruction manager 341 may direct retrieval of a video sample captured at a camera operably connected to information handling system 300 and retrieval of an audio sample captured at a microphone operably connected to information handling system 300.

In another aspect of an embodiment, an information handling system in communication with the information handling system 300 over a network (e.g., world wide web) may operate as the media source. This remote information handling system may be participating in the same user session of the multimedia multi-user collaboration application as the information handling system 300 in an embodiment. In such an embodiment, the multimedia multi-user collaboration application at the information handling system 300 may access streaming media samples via a Unique Resource Identifier (URI) defined by the multimedia multi-user collaboration application, through the network interface device (e.g., as described with reference to FIG. 1). The multimedia multi-user collaboration application in such an embodiment may then transmit the retrieved media sample (e.g., as generated at a remote information handling system) to the multimedia framework pipeline and infrastructure platform for reprocessing, and decoding. In such a way, the A/V processing instruction manager 341 of the multimedia framework pipeline and infrastructure platform 341 in an embodiment may retrieve or receive a media sample that has been captured, processed, and encoded at a remote information handling system, such as video or audio of other participants in a video conference.

As described herein, the multimedia framework pipeline and infrastructure platform 340 may also operate to perform one or more processing methods on the retrieved audio and video samples coming from another video conference participant. The A/V processing instruction manager 341 in an embodiment may operate to apply one or more A/V processing instruction modules to the retrieved sample. The A/V processing instruction manager 341 may direct whether or the order in which various A/V processing instruction modules, are employed on media samples. The video processing engine 380 may operate to apply one or more video processing A/V processing instruction modules to a video sample, each implemented by a separate module, according to execution instructions received from the A/V processing instruction manager 341. The audio processing engine 390 may operate to apply one or more audio processing A/V processing instruction modules to an audio sample, each implemented by a separate audio processing object, according to execution instructions received from the A/V processing instruction manager 341.

In an embodiment in which the camera or microphone operably connected to the information handling system 300 operates as the media source, the one or more A/V processing instruction modules may include application of a codec to compress each of the audio sample and the video sample as required for transmission of media samples across the internet, and playback of those media samples by a multimedia multi-user collaboration application, and a multiplexer to coalesce the compressed audio sample and compressed video sample into a processed, encoded (e.g., by a codec) media sample. Other processing methods in an embodiment may be dictated by one or more features of the multimedia multi-user collaboration application, or optimized instructions received from the intelligent collaboration contextual session management system, as described herein.

The video processing engine 380 may operate at the direction of the A/V processing instruction manager 341 to perform one or more of the algorithms associated with the plurality of modules within the video processing engine 380. For example, the eye contact correction module 381 in an embodiment may operate in an embodiment in which multiple video media samples are captured from a plurality of cameras, each oriented at different angles from the user of the information handling system 300. In such an embodiment, the eye contact correction module 381 may compare images from each of these received video samples (e.g., from each of the plurality of cameras) and identify the image in which the user is looking most directly into the capturing camera. The eye contact correction module 381 in such an embodiment may then transmit an identification of that camera to the A/V processing instruction manager 341, so that further video processing steps are only performed on the video sample received from the camera into which the user is currently looking.

The user framing module 382 in an embodiment may operate to identify a user's face and center the user's face within each captured image making up the video sample. In an embodiment, the super resolution module 383 may recover a high-resolution image from a low-resolution image, using a known degradation function. The zoom and face normalizer module 384 in an embodiment may operate to crop, enlarge, or scale down various captured images constituted the captured video sample to normalize the size of the user's face across each of the captured images. Other modules not shown in FIG. 3 may apply further A/V processing instruction modules to video samples in some embodiments. For example, a boundary detection module may operate to detect the boundaries of the user within each captured image of a captured video sample, and a virtual background module may apply a virtual background around the detected user boundary. It is contemplated other A/V processing instruction modules known in the art may also be employed, such as a hand detection algorithm, for example.

The compression module 385 in an embodiment may perform one or more algorithms or digital transforms to compress or decompress the received and processed video sample. Various compression algorithms may be employed in various embodiments. In some embodiments, the compression algorithm used may conform to one or more standards, selected or identified for use by the multimedia multi-user collaboration application. For example, the multimedia multi-user collaboration application may require all media samples transmitted to sinks (e.g., Universal Resource Identifiers or URIs) accessible by various agents or APIs of the multimedia multi-user collaboration application executing across a plurality of information handling systems, adhere to the Motion Picture Experts Group 4 (MPEG-4) standard established by a Joint Technical Committee (JTC) of the International Organization for Standardization and International Electrotechnical Commission (IOS/IEC). This is only one example of a standard required by the multimedia multi-user collaboration applications in an embodiment, and is meant to be illustrative rather than limiting. It is contemplated the video processing engine 380 in an embodiment may include various modules for encoding or decoding video samples or media samples using any known, or later developed standards.

The MPEG-4 standard may define one or more algorithms or A/V processing instruction modules (e.g., reduced-complexity integer discrete cosine transform) that may be used to compress and decompress video samples or audio samples. For example, the H.264 Advanced Video Coding (AVC), defined by part 10 of the MPEG-4 standard is the most widely used codec by video developers. Other video compression algorithms available under the MPEG-4 standard may also define 3D graphics compression (e.g., part 25), web video coding (e.g., part 29), internet video coding (e.g., part 33), and video coding for browsers (e.g., part 31). Each of these compression algorithms may be associated with different processing requirements for coding or decoding streaming media data in an embodiment. For example, the H.264 compression algorithm may require more processing resources than the video coding for browsers compression algorithm. Thus, the load placed on the processor executing such algorithms in an embodiment may be increased or decreased by choosing one of these compression algorithms over another.

Upon application of all other A/V processing instruction modules (e.g., 381, 382, 383, 384, and 385) in an embodiment, the multiplex module 386 may combine or coalesce the processed video sample and the processed audio sample into a single, processed and encoded (e.g., via the video compression module 385) media sample for transmission. The same, similar, or complimentary A/V processing instruction modules may be performed on remotely captured media samples received at the information handling system 300 for demultiplexing, decoding, and display or presentation on the information handling system 300, as described in greater detail below. The eye contact correction module 381, user framing module 382, super resolution module 383, and zoom and face normalizer module 384 may comprise A/V processing instruction modules, which may comprise machine executable code instructions executing at various controllers or processors of the information handling system 300. Any one or more of eye contact correction module 381, user framing module 382, super resolution module 383, zoom and face normalizer module 384 or other A/V processing instruction modules routinely applied pursuant to instructions received from the multimedia multi-user collaboration application (e.g., boundary detection, virtual background) may be applied to a captured video sample in an embodiment. Further, each of the algorithms executed by these modules (e.g., 381, 382, 383, and 384) may be implemented in any order. In some embodiments, one or more of the algorithms executed by these modules (e.g., 381, 382, 383, and 384) may be skipped. In other embodiments, the video processing engine 380 may skip the algorithms executed by each these modules (e.g., 381, 382, 383, and 384), and may only perform compression of the video sample via the video compression module 385, and multiplexing of the encoded or compressed video sample with the encoded or compressed audio sample via module 386.

The audio processing engine 390 may operate to process audio samples, and may include, for example, a voice mode effects audio processing object 391 and an audio compression module 393. The audio compression module 393 in an embodiment may apply a compression algorithm or codec to the captured audio sample to compress it. Several audio codecs may be used under part 3 of the MPEG-4 standard, including Advanced Audio Coding (AAC), Audio Lossless Coding (ALS), and Scalable Lossless Coding (SLS), among others. As with the video compression algorithms described directly above, each of these audio compression algorithms may be associated with different processing requirements for coding or decoding streaming audio samples in an embodiment. Thus, the choice of audio compression algorithm may affect load placed on the processor executing such algorithms in an embodiment.

The voice mode effects audio processing object 391 in an embodiment may include modules for application of other digital signal processing effects, including, for example, a background noise reduction module 392. In an embodiment, the background noise reduction module 392 may operate to isolate the user's voice from surrounding background noise and either amplify the user's voice, or reduce or remove the background noise. In other embodiments, the voice mode effects audio processing object 391 may include other modules for further digital signal processing effects, including voice modulation, graphic equalization, reverb adjustment, tremolo adjustment, acoustic echo cancellation, or automatic gain control. It is contemplated any known or later developed digital signal processing effects commonly used in multimedia multi-user collaboration applications may also be executed as one or more modules within the voice mode effects audio processing object 391 in various embodiments. Any one or more of these voice mode effects audio process object modules (e.g., 392) may be applied to a captured audio signal in an embodiment. In other embodiments, the audio processing engine 390 may apply no voice mode effects audio processing object digital signal processes, and may only perform compression of the audio sample via the audio compression module 393. As described directly above, following processing and encoding or compression of the audio sample in such a way, the A/V processing instruction manager 341 may instruct the video processing engine 381 to multiplex or combine the processed and encoded video sample with the processed and encoded audio sample to generate a processed and encoded media sample. In such a way, the video processing engine 380 and audio processing engine 390, operating pursuant to execution instructions received from the A/V processing instruction manager 341, may combine an audio sample with a video sample, both captured at the information handling system 300, into a single, processed and encoded media sample, such that the processed and encoded media sample may be transmitted or streamed to other information handling systems via a network (e.g., the world wide web).

In an embodiment in which the media source is a URI enabling access to a streaming media sample generated from a remote information handling system engaged in the same user session of the multimedia multi-user collaboration application, the A/V processing instruction manager 341 may direct the performance by the video processing engine 380 or the audio processing engine 390 of demultiplexing the received media sample into an encoded audio sample and an encoded video sample. For example, the A/V processing instruction manager 341 may direct the demultiplex module 386 of the video processing engine 380 to demultiplex or split the audio sample from the video sample within the received media sample. This may be referred to herein as "reprocessing" the received media sample. Upon demultiplexing, the A/V processing instruction manager 341 may instruct the video processing engine 380 to perform one or more further A/V processing instruction modules on the demultiplexed video sample. For example, the video compression module 381 may decode or decompress the demultiplexed video sample into a format that may be transmitted via the streaming media driver 325 to a digital display for playback. In other embodiments, one or more of the other modules (e.g., 382, 383, 384, or 385) may also perform similar or identical algorithms to those described above with respect to video samples captured at the information handling system 300.

The A/V processing instruction manager 341 may also instruct the audio processing engine 390 to perform one or more further A/V processing instruction modules on the demultiplexed audio sample in an embodiment. For example, the audio compression module 393 may decode or decompress the demultiplexed audio sample into a format that may be transmitted via the streaming media driver 325, the audio driver 329 to a peripherally attached speaker for playback. In other embodiments, one or more other modules (e.g., 392) may also perform similar or identical algorithms to those described above with respect to audio samples captured at the information handling system 300. In such a way, the video processing engine 380 and audio processing engine 390, operating pursuant to execution instructions received from the A/V processing instruction manager 341, may reprocess the encoded media sample received from a remote information handling system participating in the same user session of the multimedia multi-user collaboration application as the information handling system 300, such that the received media sample may be played back for the user of the information handling system 300.

As also described herein, the multimedia framework pipeline and infrastructure platform 340 may operate to transmit a media sample to a media sink. In an embodiment in which the camera or microphone operably connected to the information handling system 300 operates as the media source, an information handling system located remotely from information handling system 300 and engaged in the same user session for the multimedia multi-user collaboration application as information handling system 300 may operate as the media sink. In such an embodiment, the multimedia framework pipeline and infrastructure platform 340 may stream the processed and encoded media sample over a network (e.g., world wide web) via a URI defined by the multimedia multi-user collaboration application, such that a plurality of other information handling systems engaged in the same user session for the multimedia multi-user collaboration application may access the streaming media sample.

In an embodiment in which the media source is a URI enabling access to a streaming media sample generated from a remote information handling system engaged in the same user session of the multimedia multi-user collaboration application, the digital display of information handling system 300 may operate as the media sink. In such an embodiment, the video sample demultiplexed and decoded from the processed and encoded media sample retrieved from the URI defined by the multimedia multi-user collaboration application may be transmitted to the streaming media driver 325 for playback of the video via the digital display of the information handling system 300 (e.g., as described in greater detail with reference to FIG. 6). In another aspect of such an embodiment, the audio sample demultiplexed and decoded from the processed and encoded media sample retrieved from the URI defined by the multimedia multi-user collaboration application may be transmitted to the streaming media driver 325 for playback of the video via an operably connected speaker of the information handling system 300 (e.g., as described in greater detail with reference to FIG. 6). In such a way, the multimedia framework pipeline and infrastructure platform 340 may operate to retrieve audio and video samples from a media source, perform one or more processing methods on the retrieved audio and video samples, multiplex the audio and video samples together to form a processed media sample, and transmit the processed media sample to a media sink.

Figure 4:
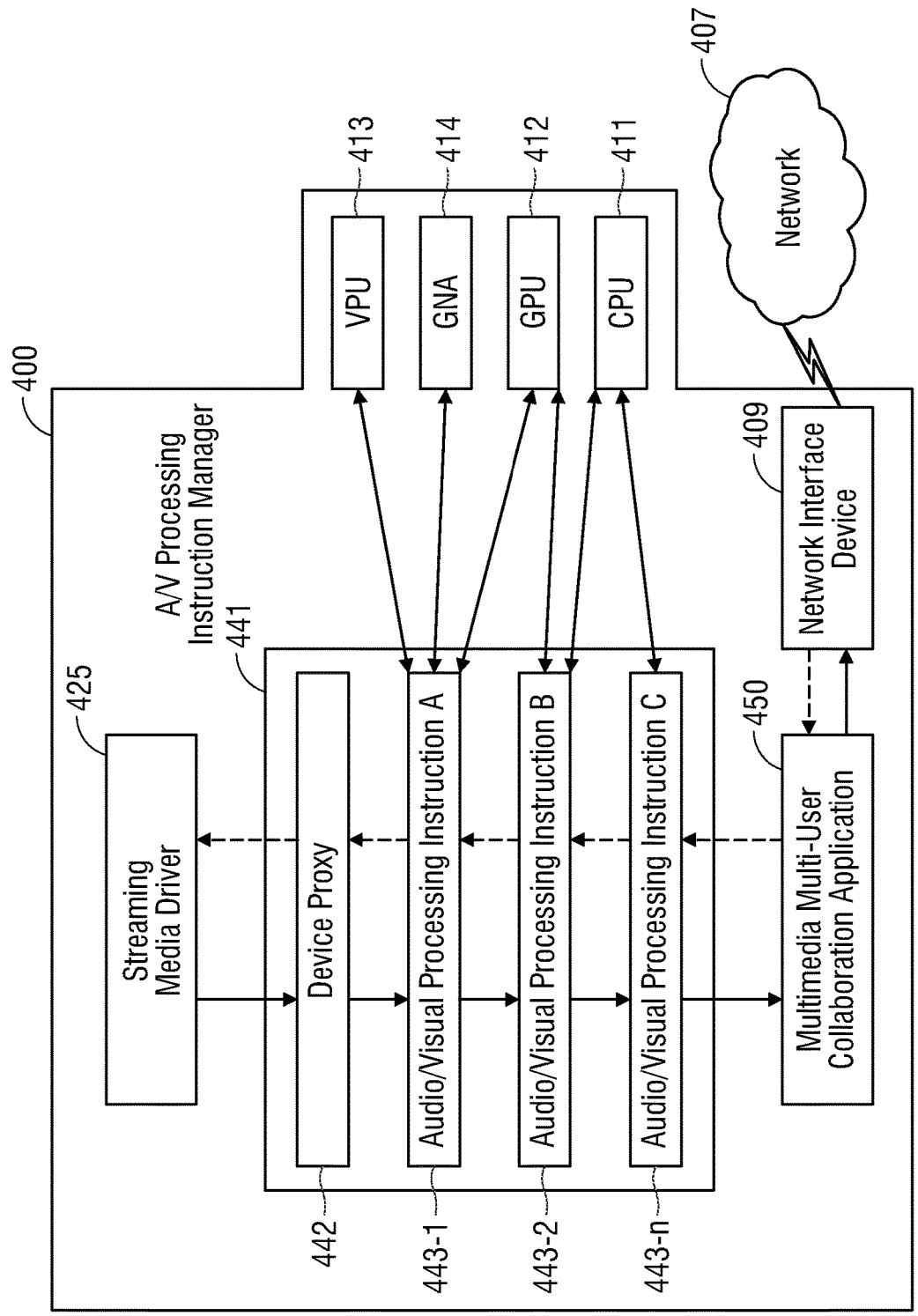
FIG. 4 is a block diagram illustrating audio/visual (A/V) processing instruction manager for optimizing information handling system operation of a multimedia, multi-user collaboration application according to an embodiment of the present disclosure.

FIG. 4 is a block diagram illustrating an A/V processing instruction manager operating to process media samples transmitted between a streaming media driver and a multimedia multi-user collaboration application of an information handling system according to an embodiment of the present disclosure. The A/V processing instruction manager 441 of a multimedia framework pipeline and infrastructure platform may operate to retrieve audio and video samples from a camera or microphone, perform one or more processing methods on the retrieved audio and video samples, multiplex the audio and video samples together to form a processed media sample, and transmit the processed media sample from a media source information handling system to a media sink information handling system.

The information handling system 400 may act as a media sink and a media source, depending upon the location at which such media samples are captured. For example, in an embodiment in which the camera of an information handling system 400 captures video samples and a microphone of the information handling system 400 captures audio samples, both pursuant to media capture instructions received by the A/V processing instruction manager 441, the information handling system 400 may act as the media source and transmit media samples to a media sink information handling system. Movement of such captured video samples, audio samples, and processed and encoded media samples throughout various post-capture media processing methods in such an embodiment may be represented in FIG. 4 by the flat or non-dashed arrows.

In an embodiment in which the information handling system 400 acts as a media source, the streaming media driver 425 (or other drivers) may execute media capture instructions received from the A/V processing instruction manager 441 to instruct capture of video samples via one or more cameras and capture of audio samples via one or more microphones of information handling system 400. As described herein, such media capture instructions may include default media capture instructions stored at the streaming media driver 425 or other drivers, default media capture instructions generated by the multimedia multi-user collaboration application 450, or optimized media capture instructions generated by the intelligent collaboration contextual session management system.

Upon capture of such video samples and audio samples in an embodiment, the streaming media driver 425 (or other drivers) may transmit the captured video and audio samples to the A/V processing instruction manager 441 via a device proxy 442. The device proxy 442 in an embodiment may comprise code instructions operating at a controller. In an embodiment, the device proxy 442 may route or map connections between physical pins of the streaming media driver 425 (or other drivers) and the A/V processing instruction manager 441. The streaming media driver 425 may comprise firmware or software code instructions executable to allow communication between various media hardware (e.g., camera, microphone, speakers, display) and the operating system (OS). The A/V processing instruction manager 441 in an embodiment may comprise code instructions executable within the OS environment via one or more processors (e.g., VPU 413, GNA 414, GPU 412, or CPU 411) of the information handling system 400. As the A/V processing instruction manager 441 manages execution of either a video sample or an audio sample in such an embodiment, the A/V processing instruction manager 441 may employ the device proxy 442 to retrieve the video sample from one of the physical pins within a driver operably connected to the camera prior to execution of a video processing method. Similarly, the A/V processing instruction manager 441 may employ the device proxy 442 to retrieve the audio sample from one of the physical pins within a driver operably connected to the microphone prior to execution of an audio processing method. The communication between the streaming media driver 425 and the device proxy 442 in such an embodiment may be executed by the A/V processing instruction manager 441 executing code in kernel mode on the CPU 411 in an embodiment.

The A/V processing instruction manager 441 in an embodiment may apply one or more A/V processing instruction modules, each representing processing methods, on the audio sample and the video sample. For example, the A/V processing instruction manager 441 in an embodiment may perform an A/V processing instruction A 443-1 for providing features specific to the multimedia multi-user collaboration application 450, perform A/V processing instruction B 443-2 for compressing an audio sample or a video sample, one or more additional A/V processing instruction modules, and perform any additional A/V processing instruction C 443-n, such as multiplexing the processed and encoded audio and video samples together to form a processed and encoded media sample. In such an embodiment, the processed and encoded media sample may then be transmitted or streamed to the multimedia multi-user collaboration application 450, where it will be streamed to a URI in the network 407 via the network interface device 409. The information handling system 400 will thus function as a media source.

In an embodiment in which the information handling system 400 acts as the media sink, the multimedia multi-user collaboration application 450 may retrieve a processed and encoded media sample from a URI within network 407, via the network interface device 409. Upon retrieval of such a processed and encoded media sample captured at an information handling system acting as the media source and located remotely from information handling system 400, the A/V processing instruction manager 441 may retrieve the processed and encoded media sample from the multimedia multi-user collaboration application 450 via network interface device 409. The A/V processing instruction manager 441 in an such embodiment may apply one or more A/V processing instruction modules, each representing processing methods, on the received media sample, processed and encoded at the remote media source information handling system. For example, the A/V processing instruction manager 441 in an embodiment may perform an A/V processing instruction C 443-n for demultiplexing or splitting a video sample from an audio sample within the processed and encoded media sample. The A/V processing instruction manager 441 in such an embodiment may also perform an A/V processing instruction B 443-2 for decoding the audio sample and the video sample, respectively, and perform any additional A/V processing instruction modules C 443-n such as providing features specific to the multimedia multi-user collaboration application 450, such as super resolution. In such an embodiment, the re-processed (e.g., demultiplexed) and decoded audio and video samples may then be transmitted to the streaming media driver 425 (or other drivers of the information handling system 400) for playback via a digital display and speakers operably connected to the information handling system 400.

The information handling system 400 in an embodiment may include a plurality of processors, including, for example, a Central Processing Unit (CPU) 411, a Graphics Processing Unit (GPU) 412, a Vision processing unit 413, and a Gaussian neural accelerator (GNA) 414. The CPU 411 in an embodiment may execute the bulk of tasks relating to all software applications running via the operating system (OS), which may include the multimedia multi-user collaboration application 450, the multimedia framework pipeline and infrastructure platform incorporating the A/V processing instruction manager 441, as well as several others. Increased processing load placed on the CPU 411 by the A/V processing instruction manager 441 during execution of a user session for the multimedia multi-user collaboration application 450 may decrease the processing resources left available for all other applications also running at the OS, which may include word processing applications (e.g., Microsoft® Word®), presentation applications (e.g., Microsoft® PowerPoint®), e-mail applications, web browsers, and other applications routinely used in conjunction with the multimedia multi-user collaboration application throughout a typical workday.

The GPU 412 in an embodiment may be a processor specialized for rapidly manipulating and altering memory to accelerate the creation of a video sample using a plurality of captures images stored in a frame buffer. GPU 412 may be more efficient at manipulating such stored video samples during image processing performed by one or more of the A/V processing instruction modules (e.g., 443-1, 443-2, and 443-n) in an embodiment. The VPU 413 in an embodiment may be specialized for running machine vision algorithms such as convolutional neural networks (e.g., as used by the user framing module, super resolution module, zoom and face normalizer module, or eye contact correction modules described with reference to FIG. 3). The GNA 414 in an embodiment may comprise low-power co-processor to the CPU, or a System on a Chip (SoC) that can run under very low-power conditions to perform a specialized task, such as real-time translations ongoing conversations, or various other audio and video processing methods represented by any one of the A/V processing instruction modules 443-1, 443-2, or 443-n. The GNA 414 may operate in an embodiment to offload continuous inference workloads from the CPU 411, GPU 412, or VPU 413, including but not limited to noise reduction or speech recognition, to save power and free CPU 411 resources.

Each of the A/V processing instruction modules (e.g., 443-1, 443-2, and 443-n) in an embodiment may be sets of algorithms or code instructions executed via the operating system (OS), using one of the processors of the information handling system 400 for modification of video data or audio data relating to streaming video conferencing applications. It is understood that any number of A/V processing instruction modules is contemplated in discussing 443-1 through 443-n. A single processor may execute each of the A/V processing instruction modules (e.g., 443-1, 443-2, and 443-n), a subgroup thereof, or may even execute a single A/V processing instruction, according to various embodiments. The A/V processing instruction manager 441 in an embodiment may determine which processor to access in order to execute each A/V processing instruction (e.g., 443-1, 443-2, and 443-n) in an embodiment, based on offload instructions received from the intelligent collaboration contextual session management system in some embodiments. For example, in an embodiment in which the information handling system 400 acts as the media source, the A/V processing instruction manager 441 may access the VPU 413 or the GNA 414 to execute various video or audio processing algorithms supported by the features of the multimedia multi-user collaboration application, as represented by A/V processing instruction A 443-1, pursuant to an optimized offload instruction to avoid executing that A/V processing instruction using the GPU 412 or CPU 411. As another example in such an embodiment, the A/V processing instruction manager 441 may access the GPU 414 or CPU 411 to execute the audio or video compression algorithm represented by A/V processing instruction C 443-n. In yet another example in such an embodiment, the A/V processing instruction manager 441 may access CPU 411 to multiplex the processed and encoded audio and video samples into a processed and encoded media sample.

In another example embodiment in which the information handling system 400 acts as the media sink, to receive media samples captured at a remotely located information handling system, the A/V processing instruction manager 441 may offload execution of the audio or video decompression algorithm represented by A/V processing instruction C 443-n to the GPU 412. In another example of such an embodiment, the A/V processing instruction manager 441 may offload execution of various video or audio processing algorithms supported by the features of the multimedia multi-user collaboration application, as represented by A/V processing instruction B 443-2 to the GPU 412, GNA 414, or VPU 413. In such a way, the A/V processing instruction manager 441 may retrieve audio and video samples from an external media source information handling system and perform one or more processing methods on the retrieved audio and video samples in accordance with offload instructions received from the intelligent collaboration contextual session management system or the multimedia multi-user collaboration application 450.

Figure 5:
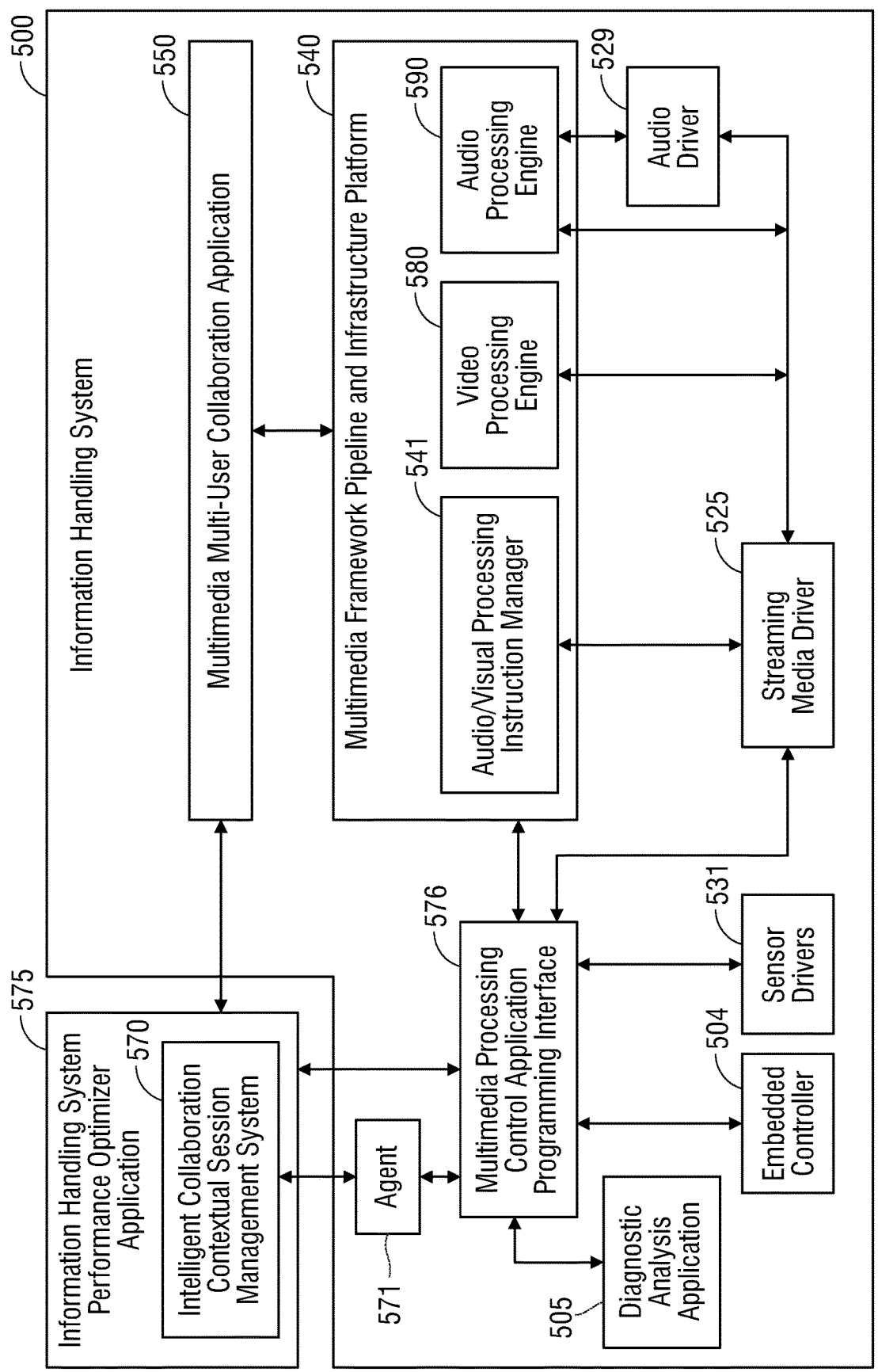
FIG. 5 is a block diagram illustrating a first embodiment of an intelligent collaboration contextual session management system for optimizing information handling system operation of a multimedia, multi-user collaboration application according to an embodiment of the present disclosure.

FIG. 5 is a block diagram illustrating a first embodiment of an intelligent collaboration contextual session management system for directing optimized capturing and processing of media samples for display during a user session of a multimedia multi-user collaboration application according to an embodiment of the present disclosure. As described herein, the intelligent collaboration contextual session management system 570 are code instructions executing on one or more processors of an information handling system executing the information handling system performance optimizer application 575, or one or more processors of information handling system 500 participating in a videoconference via multimedia multi-user collaboration system 550. The intelligent collaboration contextual session management system 570 in an embodiment may generate optimized media capture instructions for optimizing performance of the multimedia multi-user collaboration application 550.

The information handling system 500 described with reference to FIG. 5 may represent a transmitting, media source information handling system or a receiving, media sink information handling system in various embodiments. In still other embodiments, information handling system 500 may operate as both a transmitting, media source information handling system and a receiving, media sink information handling system, as may be the case for an information handling system transmitting video of one participant user while simultaneously executing code instructions for the multimedia multi-user collaboration application 550 to display videos of other participants within a shared user session of a video conferencing system. In one example embodiment, the intelligent collaboration contextual session management system 570 may be an application operating within the OS for the information handling system 500, including execution of a trained neural network for determining optimized settings described herein. For example, the information handling system 500 may execute any or all of the intelligent collaboration contextual session management system 570 via a processor (e.g., processor 102 executing code instructions of the intelligent collaboration contextual session management system 170, described with reference to FIG. 1) or embedded controller 504. In another example embodiment, the intelligent collaboration contextual session management system 570 may be an application operating as part of an information handling system performance optimizer application 575 at an information handling system located remotely from the information handling system 500. In such an example embodiment, an agent 571 or portion of the intelligent collaboration contextual session management system 570 may be operating at the information handling system 500. The agent 571 of the intelligent collaboration contextual session management system 570 in such an embodiment may be in communication with the multimedia processing control API 576 via an internal bus of information handling system 500, and in communication with the information handling system performance optimizer application 575 via a network interface device, as described in greater detail with respect to FIG. 1.

The information handling system performance optimizer application 575 in an embodiment may operate remotely from the information handling system 500 in an embodiment. For example, the information handling system performance optimizer application 575 may operate on a server, blade, rack, or cloud-based network maintained and controlled by the manufacturer of several information handling systems, or managed by an employer or enterprise owner of several information handling systems, including information handling system 500. In such an embodiment, the information handling system performance optimizer application 575 may operate to monitor certain performance metrics at each of the plurality of such information handling systems (e.g., including 500), perform firmware and software updates, confirm security credentials and compliance, and manage user access across the plurality of information handling systems (e.g., as owned by an employer or enterprise corporation, and including 500).

A neural network of the intelligent collaboration contextual session management system 570 in an embodiment may make optimization determinations as described herein on a per information handling system basis. Such a determination may be made based upon a plurality of inputs describing hardware and software performance metrics of the information handling system (e.g., 500) at issue, default media capture instructions and default A/V processing instruction module setting settings generated by the multimedia multi-user collaboration application (e.g., 550), various sensor readings taken at the information handling system (e.g., 500), and meeting metrics for the multimedia multi-user collaboration application describing performance of that application and participation of the user of the information handling system during a user session. These neural network input values may be gathered from a plurality of sensors, peripheral devices, and diagnostic applications, such as described in various example embodiments herein.

The multimedia processing control application programming interface 576 in an embodiment may operate, at least in part, as a hub, facilitating communication of each of these performance metrics, media capture instructions, and various sensor readings to the intelligent collaboration contextual session management system 570, or agent 571 thereof. For example, processing capabilities may indicate processor types available or Random Access Memory (RAM) or other memory capabilities of an information handling system. In a further example, hardware performance metrics describing total processing load at one or more processors may be gathered via an embedded controller 504 in an embodiment, and transmitted to the multimedia processing control API 576. The embedded controller 504 may also gather information describing state of charge for a power management unit, which may include a battery and an AC adapter, as described with reference to FIG. 1. The embedded controller 504 in an embodiment may gather such metrics through direct communication with the available processors (e.g., CPU, GPU, VPU, GNA, etc.) and with the power management unit (PMU). In some embodiments, such communication may occur in kernel mode.

In other embodiments, the information handling system performance optimizer application 575 may be in direct communication with the embedded controller 504 via out-of-band communications. In such embodiments, the hardware performance metrics (e.g., CPU load, current offload instructions, battery state of charge, current positional configuration of information handling system 500) may be determined by the embedded controller 504 in kernel mode and communicated to the information handling system performance optimizer application 575 directly during routine out-of-band communications between the information handling system performance optimizer application 575 and all managed information handling systems (e.g., including 500). Such out-of-band communications with the embedded controller 504 in an embodiment may be used to check security credentials or performance statistics for the information handling systems (e.g., 500), or to push software or firmware updates to the information handling systems, for example. During such routine maintenance, the information handling system performance optimizer application may accumulate, sort, and analyze all performance metrics received from all managed information handling systems (e.g., 500), including processing load across all available processors, default settings associating specific processors with specific tasks, or state of remaining charge of the battery incorporated within the PMU, for example. Out-of-band communications initiated in such a way between the embedded controller 504 and the information handling system performance optimizer application 575 may be via a wireless network such as Wi-Fi or cellular, or via wired connection.

As described herein, the multimedia processing control API 576 may operate, at least in part, as a hub to facilitate communication between various hardware, firmware, and software applications operating at information handling system 500, and the intelligent collaboration contextual session management system 570. As another example of this, the multimedia processing control API 576 may receive software performance metrics generated at a diagnostic analysis application 505, describing applications available or running, number of videoconference participants, CPU usage or load, as well as a breakdown of the CPU usage attributable to each of a plurality of applications (e.g., including a multimedia multi-user collaboration application 550) running via the operating system of the information handling system 500. The multimedia processing control API 576 may forward these software performance metrics to the neural network of the intelligent collaboration contextual session management system 570 in an embodiment.

In yet another example of the multimedia processing control API 576 facilitating communication with the intelligent collaboration contextual session management system 570 the multimedia processing control API 576 may receive sensor readings taken from one or more sensors of the information handling system 500 (e.g., a hall effect sensor or hinge rotation sensor, light sensors, IR cameras, accelerometer, gyroscope, orientation sensor, or geographic position sensors), via the sensor drivers 531, as described in greater detail with respect to FIG. 2. In still another example of the multimedia processing control API 576 facilitating communication with the intelligent collaboration contextual session management system 570 the multimedia processing control API 576 may receive default media capture instructions, default A/V processing instruction module settings, or captured audio samples from a streaming media driver 525, as described in greater detail with respect to FIG. 2. For example, audio samples may be used in some embodiments in order to determine the frequency with which the user of the information handling system 200 is talking during a user session of the multimedia multi-user collaboration application. In other embodiments, the multimedia processing control API 576 may receive default media capture instructions or default A/V processing instruction module settings via direct communication with the multimedia framework pipeline and infrastructure platform 540.

The intelligent collaboration contextual session management system 570 in an embodiment may also communicate directly with the multimedia multi-user collaboration application 550 or indirectly via the multimedia processing control API 576 to gather meeting metrics describing user participation and performance of the multimedia multi-user collaboration application 550 during a user session in which the information handling system 500 participates. The intelligent collaboration contextual session management system 570 may receive one or more meeting metrics describing performance of the multimedia multi-user collaboration application during execution of such a training user session in an embodiment. In some embodiments, these metrics may be gathered during routine out-of-band communications between the information handling system performance optimizer application 575 and the information handling system 500. Such meeting metrics may include, for example, a measure of the CPU resources consumed by the multimedia multi-user collaboration application over time. Other example meeting metrics may include a measure of memory resources consumed. Still other example meeting metrics may compare CPU or memory usage by the multimedia multi-user collaboration application 550 to total CPU or memory used by all applications, hardware, or firmware during the training user session. Yet other example meeting metrics may measure participation of the user during a user session, including, for example, a measure of the time spent muted, or whether the user is sharing his or her screen.

Such meeting metrics may also describe the performance of media sample processing, transmission, and playback among a plurality of information handling systems (e.g., including 500) engaged in a single user session for the multimedia multi-user collaboration application 550. For example, meeting metrics gathered by the intelligent collaboration contextual session management system 570 during a training session may describe latency, or a measurement of time elapsing between a first information handling system (e.g., 500) transmitting the processed, encoded media sample and a second information handling system receiving the processed, encoded media sample. As another example, meeting metrics may include a measurement of jitter, or a comparison between latency of playback for a media sample from one of the meeting participants, and latency of playback for another media sample from another of the meeting participants. Such jitter may cause the two separate media samples, which may have been recorded simultaneously, to playback such that they are out-of-sync with one another. Still other meeting metrics in an embodiment may measure bandwidth consumed by the multimedia multi-user collaboration application 550, type of network used to transmit and receive media samples, packet loss (e.g., of video or audio samples), resolution and frames per second of video samples (both at the transmitting side and the receiving side), audio bitrate (both at the transmitting side and the receiving side), and one or more codecs or compression algorithms in use. In some embodiments, jitter, packet loss, latency, resolution, and frames per second may be measured separately for one or more of audio samples, video samples, and screen sharing samples.

The multimedia processing control API 576 may forward received default media capture instructions, default A/V processing instruction module settings, captured audio samples, and various sensor readings to the intelligent collaboration contextual session management system 570 for determination of optimized adjustments to these settings using the neural network described herein. As described in greater detail with respect to FIG. 7, a neural network of the intelligent collaboration contextual session management system 570 may be separately trained for each information handling system (e.g., including 500) in communication with or managed by the information handling system performance optimizer application 575 in an embodiment. Such a training session may be performed based on the neural network input values gathered via the multimedia processing control API 576, as described directly above or according to embodiments described herein. Upon training of such a neural network unique to each information handling system (e.g., 500), the neural network may be ready to determine optimized settings for the information handling system for which it was trained, based on updated input values for a videoconferencing using the multimedia multi-user collaboration application 550. In some embodiments, this determination may be made by the neural network operating at the intelligent collaboration contextual session management system 570, located remotely from the information handling system 500. In other embodiments, the trained neural network for information handling system 500 may be transmitted from the intelligent collaboration contextual session management system 570 to an agent 571 thereof, operating at the information handling system 500.

The process described directly above for gathering inputs into the neural network (e.g., via the multimedia processing control API 576), and transmission of those inputs to the intelligent collaboration contextual session management system 570 in an embodiment may be repeated, following training of the neural network. As described in greater detail with respect to FIG. 8, the neural network in an embodiment may determine optimized audio capture settings, optimized video capture settings, optimized processing features for enablement on the transmission side, optimized processing features for enablement on the receiving side, optimized collaboration application features for enablement, or optimized offload settings. In another embodiment, the neural network may determine an optimized virtual background setting, or an optimized boundary detection algorithm. In still another embodiment, the neural network may determine a camera selection instruction, or an optimized A/V processing instruction adjustment. In still another embodiment, the neural network may determine optimized media capture settings, optimized application prioritization instructions, or optimized multi-application display settings. Each of the optimized settings or instructions output from the neural network may be transmitted to the multimedia processing control API 576 in an embodiment.

The multimedia processing control API 576 in an embodiment may transmit each of the optimized settings or instructions received from the intelligent collaboration contextual session management system 570 neural network to the application, controller, or driver at which such settings or instructions will be implemented. For example, the multimedia processing control API 576 may transmit optimized audio capture settings, optimized video capture settings, optimized multi-application display settings, or camera selection instructions to the streaming media driver 525. As described in greater detail with respect to FIG. 2, the streaming media driver 525 in an embodiment may direct the operation of the camera and the microphone such that media (e.g., images, video samples, audio samples) is captured according to the optimized media capture instructions. For example, the streaming media driver 525 in an embodiment may direct the camera to capture images and generate video samples having the frames per second, zoom settings, pan settings, or number of key frames defined by the optimized video capture instructions. As another example, the streaming media driver 525 in an embodiment may direct the microphone to capture and generate audio samples having the bitrate defined by the optimized audio capture instructions. As yet another example, the streaming media driver 525 in an embodiment may select one of a plurality of cameras to capture images and generate video samples, based on the camera selection instructions. In still another example, the streaming media driver 525 in an embodiment may direct the digital display to display graphical user interfaces for a plurality of applications, including the multimedia multi-user collaboration application 550 according to optimized multi-application display settings.

In other embodiments, the multimedia processing control API 576 may transmit various optimized settings or instructions to the streaming media driver 525 or to the multimedia framework pipeline and infrastructure platform 540. For example, the multimedia processing control API 576 may transmit optimized media capture instructions (e.g., including optimized video capture instructions and optimized audio capture instructions) to the streaming media driver 525 or to the multimedia framework pipeline and infrastructure platform 540. As described herein, streaming media driver 525 may direct peripherally connected cameras or microphones to capture video and audio. The streaming media driver 525 in an embodiment may do so pursuant to instructions received from the multimedia framework pipeline and infrastructure platform 540. Thus, instructions for performing such capture of media samples (e.g., video or audio samples) in an embodiment may be stored at or executed by one or more of the multimedia framework pipeline and infrastructure platform 540 or the streaming media driver 525.

In another aspect of an embodiment, the multimedia processing control API 576 may transmit various optimized settings or instructions to the multimedia framework pipeline and infrastructure platform 540. For example, the multimedia processing control API 576 in an embodiment may transmit optimized offload settings, optimized virtual background settings, optimized boundary detection algorithm instructions, or an optimized A/V processing instruction adjustment to the multimedia framework pipeline and infrastructure platform. As described herein, the multimedia framework pipeline and infrastructure platform may perform post-capture processing of media samples (e.g., video samples and audio samples). The multimedia framework pipeline and infrastructure platform 540 in an embodiment may include an A/V processing instruction manager 541 directing the video processing engine 580 or audio processing engine 590 to perform various post-capture media processing methods (also referred to herein as A/V processing instruction modules) on captured media samples (or on externally received media samples during a user session with the multimedia multi-user collaboration application 550). Optimized A/V processing instruction adjustments in an embodiment may direct the A/V processing instruction manager 541 to include or exclude one or more specifically identified A/V processing instruction modules in an embodiment.

Further, optimized offload settings, and optimized A/V processing instruction modules (which may include optimized virtual background settings, and optimized boundary detection algorithm instructions) may direct the ways in which the A/V processing instruction manager 541 directs execution of such A/V processing instruction modules in an embodiment. For example, optimized offload settings may cause the A/V processing instruction manager 541 to execute A/V processing instruction modules specifically identified within the optimized offload settings using one of a plurality of processors (e.g., CPU, GPU, VPU, GNA) specifically associated with that A/V processing instruction within the optimized offload settings. As another example, the A/V processing instruction manager 541 may direct one or more modules within the video processing engine 580 to apply a virtual background specifically identified within the optimized virtual background settings, using the algorithm specifically identified within the optimized boundary detection algorithm instructions. Through determination and delivery of each of these optimized settings to the information handling system 500, the intelligent collaboration contextual session management system 570 in an embodiment may optimize capture of media samples and post-capture processing of those samples to balance CPU load (and other processor loads) of the information handling system 500 with quality of user experience when engaged in a user session for the multimedia multi-user collaboration application 540.

Figure 6:
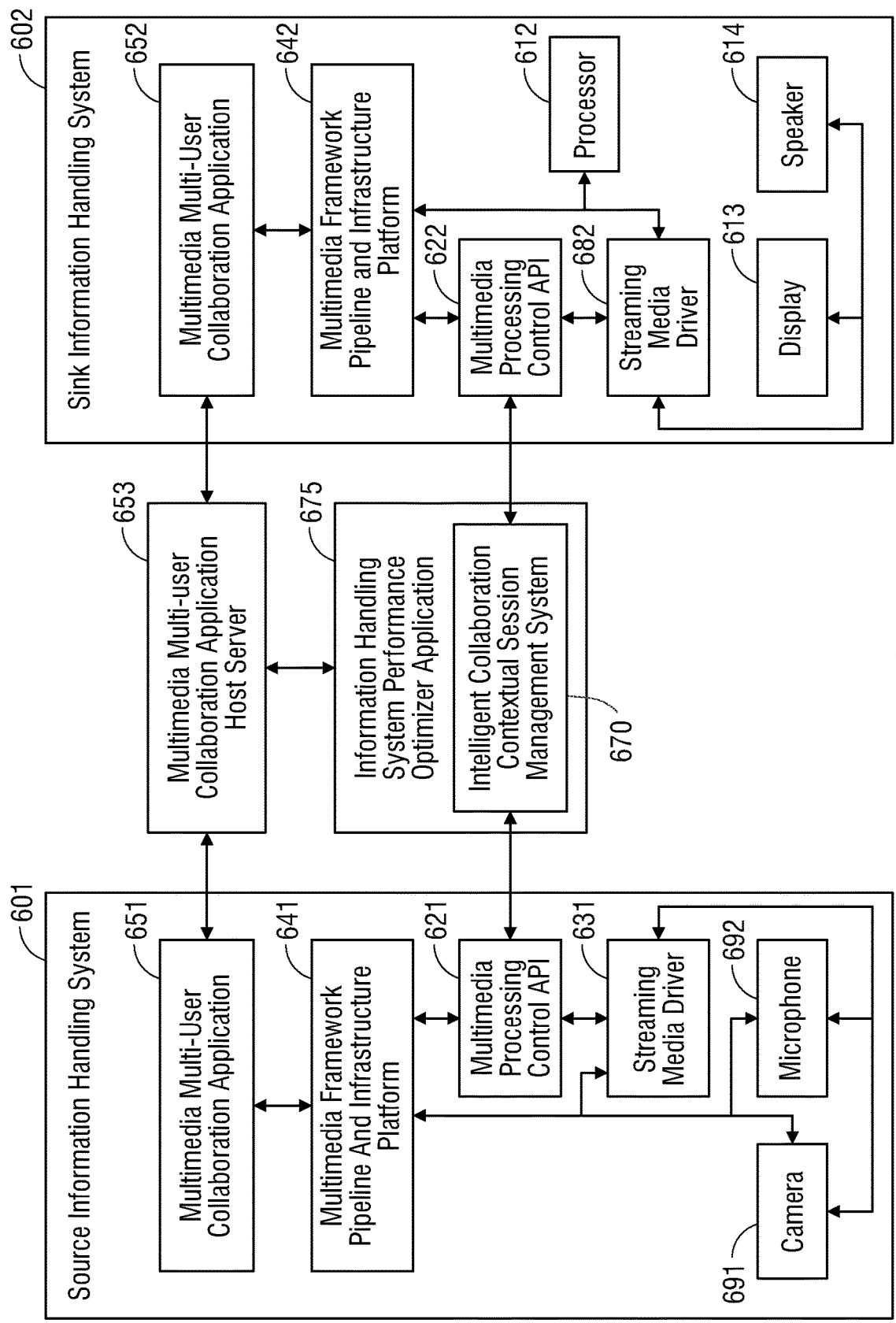
FIG. 6 is a block diagram illustrating a second embodiment of an intelligent collaboration contextual session management system for optimizing information handling system operation of a multimedia, multi-user collaboration application according to an embodiment of the present disclosure.

FIG. 6 is a block diagram illustrating a second embodiment of an intelligent collaboration contextual session management system for coordinating processing of media samples across a plurality of information handling systems that are each participating in the same user session of a multimedia multi-user collaboration application according to an embodiment of the present disclosure. User sessions may be hosted and coordinated by a multimedia multi-user collaboration application host server 653 located remotely from, but in communication with one or more source information handling systems (e.g., 601) and one or more sink information handling systems (e.g., 602) via a network.

As described herein, the intelligent collaboration contextual session management system 670 may optimize various settings for peripheral devices used in the capture at a source information handling system 601 of media samples that are to be played across a plurality of sink information handling systems (e.g., including 602) during user sessions for a multimedia multi-user collaboration application (e.g., 651 or 652). The intelligent collaboration contextual session management system 670 may optimize such settings in order to optimize performance of the multimedia multi-user collaboration application at either one or more source information handling systems (e.g., 601) or one or more sink information handling systems (e.g., 602), or both, during a user session hosted by the multimedia multi-user collaboration application host server 653. In other words, some optimized settings determined by the intelligent collaboration contextual session management system 670 may be executed at the source information handling system 601, and other optimized settings may be executed at the sink information handling system 602. By optimizing capture and processing of such media samples across a plurality of information handling systems (e.g., 601 and 602) engaged in the same user session, the intelligent collaboration contextual session management system 670 in an embodiment may compound the beneficial decreases in processing power required to play such captured videos at one or more sink information handling systems 602. It is understood that information handling system 601 and information handling system 602, as well as any other information handling systems participating within the user session hosted by the multimedia multi-user collaboration application host server 653 may operate as a media source, a media sink, or both.

The intelligent collaboration contextual session management system 670, or separate agents thereof operating at the source information handling system 601 and sink information handling system 602, respectively, may make these determinations based on metrics specific to a single user session for the multimedia multi-user collaboration application in which both the source information handling system 601 and the sink information handling system 602 are engaged. The multimedia multi-user collaboration application 651 and multimedia multi-user collaboration application 652 in an embodiment may operate through a shared network via a multimedia multi-user collaboration application host server 653 to control engagement in videoconference systems.

The multimedia multi-user collaboration application host server 653 in an embodiment may comprise a plurality of servers executing software for recording metrics for each hosted user session. Such recorded user session metrics in an embodiment may describe, for example, the number of participants in the user session, features of the multimedia multi-user collaboration application that are enabled for each participant, or the like. The additional user session metrics for a session in which the source information handling system 601 or sink information handling 602 participate may be gathered by the multimedia multi-user collaboration application host server 653, and transmitted to the multimedia multi-user collaboration application 651 and multimedia multi-user collaboration application 652 for input into the neural network of the intelligent collaboration contextual session management system 670 in some embodiments. For example, the source information handling system 601 may execute a first neural network trained by the intelligent collaboration contextual session management system 670, based on inputs previously gathered at the source information handling system 601 (e.g., as described with reference to FIGS. 2 and 5) to make such a determination. As another example, the sink information handling system 602 may execute a second neural network trained separately by the intelligent collaboration contextual session management system 670, based on inputs previously gathered at the source information handling system 602, to make such a determination. Both may use metrics from the multimedia multi-user collaboration application host server 653.

As described herein, for example in an embodiment described with reference to FIG. 5, the intelligent collaboration contextual session management system 670 may transmit optimized settings or instructions to the multimedia processing control API (e.g., 621 or 622), based on outputs from the trained neural networks for each respective information handling system (e.g., 601, or 602). In an embodiment shown in FIG. 6, in which the intelligent collaboration contextual session management system 670 operates within the information handling system performance optimizer application 675, remotely from either the source information handling system 601 or the sink information handling system 602, the intelligent collaboration contextual session management system 670 may determine such optimized settings or instructions for the source information handling system 601 using a first neural network trained specifically based on neural network input values previously received from the source information handling system 601. The intelligent collaboration contextual session management system 670 in such an embodiment may transmit the optimized settings or instructions output by this first neural network to the multimedia processing control API 621, for example. In such an embodiment, the intelligent collaboration contextual session management system 670 may determine such optimized settings or instructions for the sink information handling system 602 using a second neural network trained specifically based on neural network input values previously received from the sink information handling system 602. The intelligent collaboration contextual session management system 670 in such an embodiment may transmit the optimized settings or instructions output by this second neural network to the multimedia processing control API 622, for example. In other example embodiments, the multimedia processing control API 621 may receive such optimized settings or instructions output by such a first neural network operating at the source information handling system 601, and the multimedia processing control API 622 may receive such optimized settings or instructions output by such a second neural network operating at the sink information handling system 602.

Optimized settings or instructions output by such a first neural network and transmitted to the multimedia processing control API 621 of the source information handling system 601 in an embodiment may include, for example, optimized audio capture settings, optimized video capture settings, or optimized A/V media processing instructions. The multimedia processing control API 621 in such an embodiment may transmit these optimized settings to the streaming media driver 631. The streaming media driver 631 in such an embodiment may direct the camera 691 to capture video samples according to the optimized video capture settings and direct the microphone 692 to capture audio samples according to the optimized audio capture settings. As another example embodiment, the streaming media driver 631 in an embodiment may select one of a plurality of cameras (e.g., camera 691) to capture images and generate video samples, based on the camera selection instructions. In some embodiments, the optimized audio capture settings or optimized video capture settings may be transmitted from the multimedia processing control API 621 to the multimedia framework pipeline and infrastructure platform 641 instead, as described in greater detail with respect to FIG. 5.

Optimized settings or instructions output by a first neural network trained for source information handling system 601 and transmitted to the multimedia processing control API 621 in an embodiment may also include, for example, optimized processing features for enablement on the transmission side, optimized collaboration application features for enablement, optimized offload settings, optimized virtual background settings, optimized boundary detection algorithm instructions, or other optimized A/V processing instruction adjustment. The intelligent collaboration contextual session management system 670 in an embodiment may transmit one or more of these optimized features for enablement, offload settings, or optimized instructions to the multimedia framework pipeline and infrastructure platform 641.

As described in greater detail with reference to FIGS. 3-4, the A/V processing instruction manager of the multimedia framework pipeline and infrastructure platform 641 in an embodiment may execute one or more A/V processing instruction modules on video samples received from the camera 691 via the streaming media driver 631, and audio samples received from the microphone 692 via the streaming media driver 631. The A/V processing instruction modules executed by the multimedia framework pipeline and infrastructure platform 641 in such an embodiment may be selected or enabled based on the optimized processing features for enablement on the transmission side, optimized virtual collaboration application features for enablement, or optimized A/V processing instruction adjustments. Further, the algorithms or methods employed during execution of each of these A/V processing instruction modules, and the processor executing such algorithms may be chosen based on the optimized offload settings, optimized virtual background settings, or optimized boundary detection algorithm instructions in an embodiment. For example, A/V processing instruction adjustments in an embodiment may further identify a specific type of encoding algorithm that requires lower computing overhead. These optimized settings and instructions may decrease the load on the CPU of the source information handling system 601 during such post-capture processing.

The load on the CPU of the source information handling system 601 during execution of these post-capture media processing methods may also be decreased as a consequence of the methods used to perform such captures. For example, by capturing the video samples using optimized video capture instructions and capturing the audio samples using optimized audio capture instructions, the richness of data within the captured video and audio samples may decrease in some embodiments, causing another decrease in the amount of processing power required for the algorithms associated with various A/V processing instruction modules to be performed on these samples. As also described with respect to FIG. 4, the load on the CPU of the source information handling system 601 in an embodiment may be further decreased by directing the A/V processing instruction manager of the multimedia framework pipeline and infrastructure platform 641 to engage processors (e.g., GPU, VPU, GNA) other than the CPU of the source information handling system 601 to execute various A/V processing instruction modules. In such a way, the intelligent collaboration contextual session management system 670 may decrease the load on the CPU at the source information handling system 601 through a variety of methods. This may free up processing power for execution of other software applications (e.g., other than the multimedia multi-user collaboration application 651) during a user session for the multimedia multi-user collaboration application 651, and result in greater overall user experience.

By optimizing the post-capture media processing methods applied to the video samples and audio samples captured at the source information handling system 601, the intelligent collaboration contextual session management system 670 may also decrease the load on the CPU at the sink information handling system 602 during a user session shared between the multimedia multi-user collaboration application 601 and the multimedia multi-user collaboration application 652. As described in greater detail with reference to FIG. 4, the A/V processing instruction manager of the multimedia framework pipeline and infrastructure platform (e.g., 641) at the source information handling system (e.g., 601) may perform several A/V processing instruction modules on incoming audio and video samples, including encoding and multiplexing of these samples to form a processed, encoded media sample. In such an embodiment, the processed, encoded media sample may be then be forwarded to the multimedia multi-user collaboration application 651 for transmission (e.g., via a network) to the multimedia multi-user collaboration application 652 at the sink information handling system 602.

The multimedia framework pipeline and infrastructure platform 642 at an information handling system operating as a media sink in an embodiment may retrieve the remotely captured, media sample that was processed and encoded at a source information handling system (e.g., 601). The remotely captured media sample may include audio and video captured at the source information handling system 601 from the multimedia multi-user collaboration application 652. In such an embodiment, the multimedia framework pipeline and infrastructure platform 642 may perform one or more A/V processing instruction modules on the processed and encoded media sample, including demultiplexing and decoding of the media sample into formats compatible with the display 613 and speakers 614 of the sink information handling system 602. For example, a multiplexing module of the multimedia framework pipeline and infrastructure platform 642 may demultiplex or split the processed and encoded media sample captured at the source information handling system 601 into an encoded video sample and an encoded audio sample. As another example, a video compression module of the multimedia framework pipeline and infrastructure platform 642 may decode or decompress the demultiplexed video sample into a format that may be transmitted via the streaming media driver 682 to a digital display 613 for playback. As yet another example, an audio compression module of the multimedia framework pipeline and infrastructure platform 642 may decode or decompress the demultiplexed audio sample into a format that may be transmitted via the streaming media driver 682 to a peripherally attached speaker 614 for playback.

The complexity of the algorithm used to encode or compress the audio sample at the source information handling system 601 may correlate to or match the complexity of the algorithm used to decode or decompress the audio sample at the sink information handling system 602 in an embodiment. Similarly, the complexity of the algorithm used to encode or compress the video sample at the source information handling system 601 may correlate to or match the complexity of the algorithm used to decode or decompress the video sample at the sink information handling system 602 in an embodiment. Thus, by encoding the audio and video samples using a less complex algorithm at the source information handling system 601, based on optimized A/V processing instruction adjustments, the intelligent collaboration contextual session management system 670 in an embodiment may also decrease the complexity of the algorithm used to decode the audio and video samples at the sink information handling system 602. This may effectively decrease the load on the processor 612 during such decoding.

The video sample demultiplexed and decoded from the processed and encoded media sample retrieved from the multimedia multi-user collaboration application 652 in an embodiment may be transmitted to the streaming media driver 682 for playback of the video via the digital display 613 of the information handling system 602. In another aspect of such an embodiment, the audio sample demultiplexed and decoded from the processed and encoded media sample retrieved from the multimedia multi-user collaboration application 652 may be transmitted to the streaming media driver 682 for playback of the audio via an operably connected speaker 614 of the information handling system 602.

Figure 7:
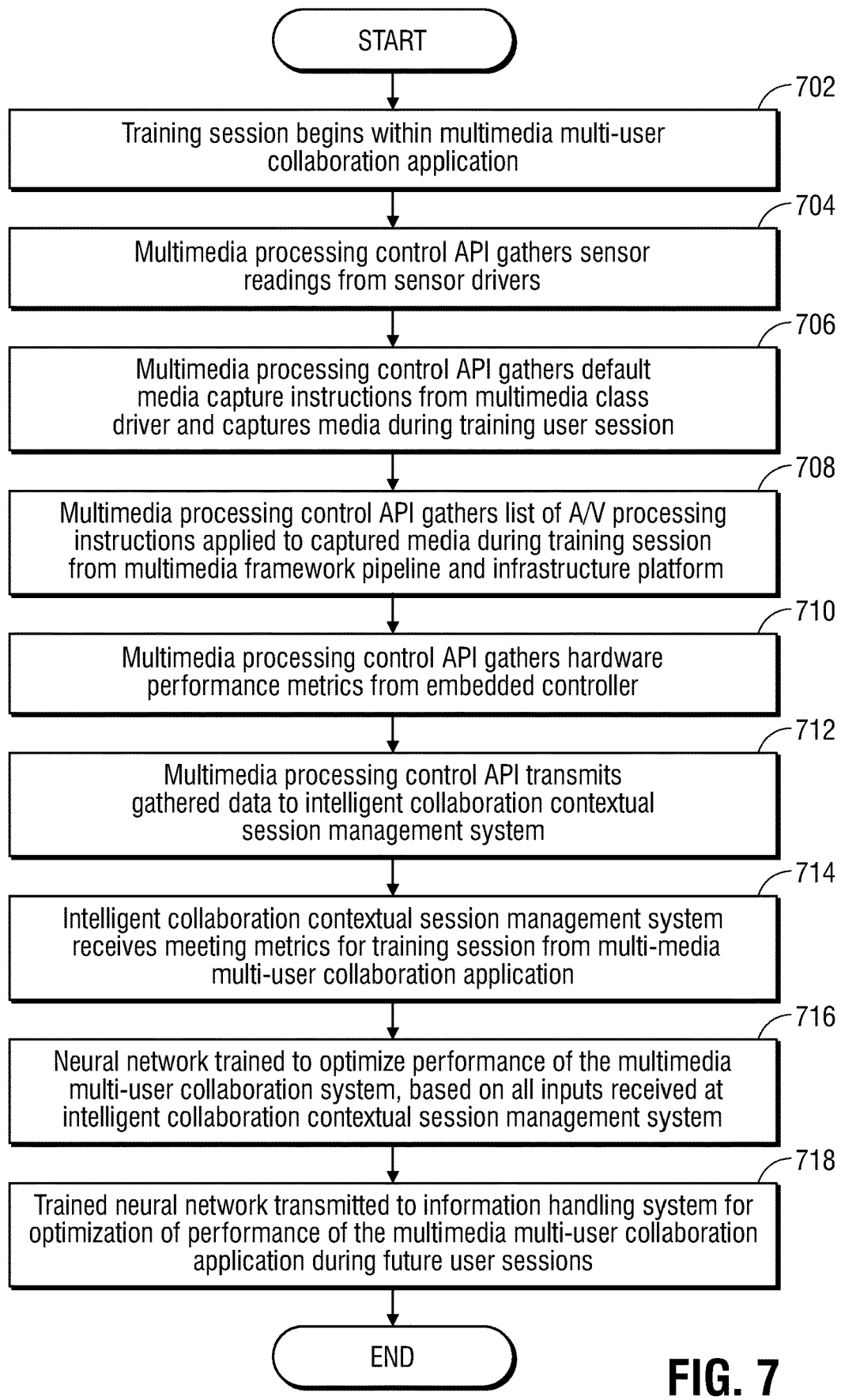
FIG. 7 is a flow diagram illustrating a method of training a neural network to optimize performance of a multimedia multi-user collaboration application of an information handling system according to an embodiment of the present disclosure.

FIG. 7 is a flow diagram illustrating a method of training a neural network of the intelligent collaboration contextual session management system to identify output adjustments to media capture settings, A/V processing instruction adjustments, and offload settings that optimize performance of a multimedia multi-user collaboration application during a training user session according to an embodiment of the present disclosure. The intelligent collaboration contextual session management system in an embodiment may gather input variables describing media capture settings for capturing audio and video samples during such a training user session, as well as a list of A/V processing instruction modules performed on these captured samples and the processors that executed these A/V processing instruction modules. These input variables may be gathered for a plurality of training sessions in which a single information handling system participates, in order to tailor the neural network to optimize performance of the multimedia multi-user collaboration application as it is executed at that specific information handling system in an embodiment. The intelligent collaboration contextual session management system may further gather meeting metrics describing performance of the multimedia multi-user collaboration application during such training user sessions. By comparing different settings for the media capture, A/V processing instruction modules applied to the captured media, and the processors used to execute such A/V processing instruction modules to these performance measurements, the neural network may learn to identify settings optimized to produce the best possible performance values for the multimedia multi-user collaboration application during future user sessions in which the information handling system for which the neural network has been trained may engage.

At block 702, a training user session may begin within the multimedia multi-user collaboration application in an embodiment. For example, in an embodiment described with reference to FIG. 6, a source information handling system 601 and a sink information handling system 602 may both join a single user session for the multimedia multi-user collaboration application (e.g., 651 and 652) via a central, networks multimedia multi-user collaboration application host server 653, an agent of which may be operating at both the source information handling system 601 and the sink information handling system 602. It is understood that each information handling system 601 and 602 may function as a media source and as a media sink. A training user session may be differentiated from other user sessions in an embodiment in that applications, drivers, or firmware other than the intelligent collaboration contextual session management system may provide media capture instructions, A/V processing instruction adjustments, or offload instructions. Only after such training user sessions have been completed may the intelligent collaboration contextual session management system in an embodiment generate optimized media capture instructions, optimized A/V processing instruction adjustments, or optimized offload instructions. A plurality of training user sessions may be completed in an embodiment prior to conclusion of the training phase for the neural network of the intelligent collaboration contextual session management system.

The multimedia processing control API may gather sensor readings from sensor drivers at block 704 in an embodiment. For example, in an embodiment described with reference to FIG. 2, various sensor readings may be taken by the information handling system 200 and communicated to the intelligent collaboration contextual session management system. More specifically, the information handling system 200 may include one or more sensors within a sensor array 230 as described in various embodiments herein. All sensor readings from sensors within the sensor array 230 in an embodiment may be transmitted to the sensor drivers 231. This sensor information in an embodiment may include information used to determine the level of participation of a user in a videoconference user session. For example, an IR camera may sense whether the user of the information handling system is located within a certain distance of the display device. The multimedia processing control API 574 may forward various sensor readings to the intelligent collaboration contextual session management system 570 for determination of optimized settings using the neural network described herein.

The multimedia processing control API may gather default media capture instructions from a streaming media driver in an embodiment at block 706. For example, in an embodiment described with reference to FIG. 2, default media capture instructions and default A/V processing instruction module settings may be gathered via a streaming media driver 225 and transmitted to the intelligent collaboration contextual session management system. Default media capture instructions in an embodiment may be generated by the multimedia multi-user collaboration application, or may be preset by the manufacturer of the camera, microphone, or information handling system 200. It is contemplated that any media capture instructions directing the capture by the camera of images or video or directing the capture by the microphone of audio that do not constitute optimized media capture instructions generated based on the output of the neural network described herein may constitute default media capture instructions. In another example embodiment described with reference to FIG. 5, the multimedia processing control API 576 may receive default media capture instructions from the streaming media driver 525. In another example embodiment described with reference to FIG. 5, the multimedia processing control API 576 may receive captured audio samples and video samples from a streaming media driver 525. Such audio samples may be used in some embodiments in order to determine the frequency with which the user of the information handling system 500 is talking during a user session of the multimedia multi-user collaboration application. This may also indicate a level of user participation in the training user session.

Such default media capture instructions and optimized media capture instructions may dictate the method by which such audio, image, and video samples are captured. For example, in an embodiment described with reference to FIG. 2, media capture instructions may identify the frames per second at which the camera 222 may capture images for generation of a video, the resolution at which the camera captures and stores such images, the number of key frames in each preset time period, zoom settings, pan settings, or instructions to center the captured image around an identified object. As another example, media capture instructions may identify the bit rate at which the microphone 224 records and saves captured audio samples.

At block 708, the multimedia processing control API may gather a list of A/V processing instruction modules applied to captured media during a training session from the multimedia framework pipeline and infrastructure platform in an embodiment. For example, in an embodiment described with reference to FIG. 2, default A/V processing instruction module settings may be gathered via the streaming media driver 225 and transmitted to the intelligent collaboration contextual session management system. In another example embodiment described with reference to FIG. 5, the multimedia processing control API 576 may receive default A/V processing instruction module settings from the streaming media driver 525. In other embodiments, the multimedia processing control API 576 may receive default A/V processing instruction module settings via direct communication with the multimedia framework pipeline and infrastructure platform 540.

At block 710, the multimedia processing control API may gather hardware performance metrics from an embedded controller in an embodiment. For example, in an embodiment described with reference to FIG. 5, hardware performance metrics describing total processing load at one or more processors may be gathered via an embedded controller 504 in an embodiment, and transmitted to the multimedia processing control API 576. The embedded controller 504 in an embodiment may gather such metrics through direct communication with the processor (e.g., CPU, GPU, VPU, GNA, etc.). In other embodiments, the information handling system performance optimizer application 575 may be in direct communication with the embedded controller 504 via out-of-band communications. In such embodiments, the hardware performance metrics (e.g., CPU load, current offload instruction) may be determined by the embedded controller 504 in kernel mode and communicated to the information handling system performance optimizer application 575 directly during routine out-of-band communications between the information handling system performance optimizer application 575 and all managed information handling systems (e.g., including 500).

The multimedia processing control API in an embodiment may transmit the data gathered at steps 704-710 to the intelligent collaboration contextual session management system in an embodiment at block 712. By gathering this data, and transmitting it to the intelligent collaboration contextual session management system in an embodiment, the multimedia processing control API may operate as a sensor hub. For example, in an embodiment described with reference to FIG. 5, the multimedia processing control API 574 may forward received default media capture instructions, default A/V processing instruction module settings, captured audio samples, captured video samples, and various sensor readings to the intelligent collaboration contextual session management system 570 for determination of optimized settings using the neural network described herein. A neural network of the intelligent collaboration contextual session management system 570 may be separately trained for each information handling system (e.g., including 500) in communication with or managed by the information handling system performance optimizer application 575 in an embodiment. Such a training session may be performed based on the neural network input values gathered via the multimedia processing control API 576, as described with respect to FIG. 7 at blocks 704, 706, 708, and 710. Upon training of such a neural network unique to each information handling system (e.g., 500), the neural network may be ready to determine optimized settings for the information handling system for which it was trained (e.g., as described in greater detail with respect to block 716), based on updated input values.

At block 714, the intelligent collaboration contextual session management system in an embodiment may receive meeting metrics for the training session from the multimedia multi-user collaboration application. For example, in an embodiment described with reference to FIG. 5, the intelligent collaboration contextual session management system 570 may be in communication with the multimedia multi-user collaboration application 550 executing the training user session at the information handling system 500. In another embodiment, described with reference to FIG. 6, the intelligent collaboration contextual session management system 670 may receive meeting metrics from the multimedia multi-user collaboration application host server 653 that hosts the training session. The intelligent collaboration contextual session management system 670 may receive one or more meeting metrics describing performance of the multimedia multi-user collaboration application during execution of such a training user session in an embodiment. Such meeting metrics may include, for example, a measure of the CPU, GPU, and other processing resources consumed by the multimedia multi-user collaboration application over time, during the training user session. Other example meeting metrics may include a measure of memory resources consumed. Still other example meeting metrics may compare CPU or other processors or memory usage by the multimedia multi-user collaboration application to total CPU or other processors or memory used by all applications, hardware, or firmware during the training user session. Yet other example meeting metrics may measure participation of the user during a user session, including, for example, a measure of the time spent muted, or whether the user is sharing his or her screen, whether a user has the camera on, or whether user's gaze is at the screen, among others.

Such meeting metrics may also describe the performance of media sample processing, transmission, and playback among a plurality of information handling systems engaged in a single user session for the multimedia multi-user collaboration application. For example, meeting metrics gathered by the intelligent collaboration contextual session management system during a training session may describe latency, or a measurement of time elapsing between a first information handling system transmitting the processed, encoded media sample and a second information handling system receiving the processed, encoded media sample. As another example, meeting metrics may include a measurement of jitter, or a comparison between latency of playback for a media sample from one of the meeting participants, and latency of playback for another media sample from another of the meeting participants. Such jitter may cause the two separate media samples, which may have been recorded simultaneously, to playback such that they are out-of-sync with one another. Still other meeting metrics in an embodiment may measure bandwidth consumed by the multimedia multi-user collaboration application, type of network used to transmit and receive media samples, packet loss (e.g., of video or audio samples), resolution and frames per second of video samples (both at the transmitting side and the receiving side), audio bitrate (both at the transmitting side and the receiving side), and one or more codecs or compression algorithms in use. In some embodiments, jitter, packet loss, latency, resolution, and frames per second may be measured separately for one or more of audio samples, video samples, and screen sharing samples. In still other examples, meeting metrics may be gathered by the multimedia multi-user collaboration application host server 653, and may describe the number of users, which users are screensharing, which users are using virtual backgrounds, which users are muted, and which participants are hosting, among other descriptions of participation among a plurality of users in a single videoconference session.

A neural network may be trained in an embodiment to model the relationship between performance of the multimedia multi-user collaboration application and all inputs received at the intelligent collaboration contextual session management system at block 716. The intelligent collaboration contextual session management system may input each of the values gathered from the multimedia processing control API and the multimedia multi-user collaboration application into a multi-layered, feed-forward, machine-learning neural network to train the neural network to model the relationship between one or more of the input values transmitted at block 712 and one or more performance metrics represented by the meeting metrics gathered at block 714. For example, the neural network may correlate media capture settings, A/V processing instruction adjustments, or offload settings with certain meeting metrics for a user session. Such meeting metrics may include the CPU or other processor resource load consumed by the multimedia multi-user collaboration application during a user session, or latency, jitter, or packet loss as measured by the multimedia multi-user collaboration application during a user session.

The intelligent collaboration contextual session management system in an embodiment may model a multi-layered, feed-forward, machine-learning classifier neural network in an embodiment, for example, as a deep-learning 4 (DL4) neural network. More specifically, the neural network in an embodiment may comprise a multi-layer perceptron (MLP) classifier neural network. Several such multi-layered feed-forward, machine-learning classifier neural networks exist in the art, and any of these networks may be chosen to model this relationship between media capture settings, A/V processing instruction adjustment, offload settings, and various meeting metrics for the multimedia multi-user collaboration application in an embodiment. For example, the DL4 neural network may operate in a Java programming language (e.g., DL4J), or within the Scala programming language (e.g., DL4S). Other deep-learning neural networks may be modeled using Apache® Maven®, for example. In still other embodiments, the DL4 neural network may be modeled using a plurality of classifiers, including a linear MLP classifier, a Moon MLP classifier, or a Saturn MLP classifier. Each of these types of MLP classifiers in an embodiment may define a different activation function that operates to define a relationship between separate layers of the neural network.

The neural network may include a plurality of layers, including an input layer, one or more hidden layers, and an output layer. The default media capture settings, default A/V processing instruction module setting adjustments, default offload settings, and meeting metrics gathered at blocks 704, 706, 708, 710, and 714 may form the input layer of the neural network in an embodiment. These input layers may be forward propagated through the neural network to produce an initial output layer that includes predicted media capture settings, predicted A/V processing instruction adjustments, predicted offload settings, and predicted meeting metrics values. Such predicted meeting metrics values in an embodiment may include, for example, CPU resource load consumed by the multimedia multi-user collaboration application, or various other meeting metrics (e.g., latency, jitter, packet loss) for the multimedia multi-user collaboration application as measured during the training session.

Actual or known values for these meeting metrics (e.g., as predicted within the output layer) may have been gathered at block 714 in an embodiment. Further, the intelligent collaboration contextual session management system may have received known values for the media capture settings, A/V processing instruction adjustments, and offload settings at block 712. Each of the output nodes within the output layer in an embodiment may be compared against such known values to generate an error function for each of the output nodes. This error function may then be back propagated through the neural network to adjust the weights of each layer of the neural network. The accuracy of the predicted meeting metric values (as represented by the output nodes) may be optimized in an embodiment by minimizing the error functions associated with each of the output nodes. Such forward propagation and backward propagation may be repeated serially during training of the neural network, adjusting the error function during each repetition, until the error function for all of the output nodes falls below a preset threshold value. In other words, the weights of the layers of the neural network may be serially adjusted until the output node for each of the meeting metrics, media capture settings, A/V processing instruction adjustments, and offload settings accurately predicts the known values received at blocks 712 and 714. In such a way, the neural network may be trained to provide the most accurate output layer, including a prediction of the multimedia multi-user collaboration application performance, based on various media capture settings, A/V processing instruction adjustments, and offload settings.

Such a training of the neural network in an embodiment based on known values received at blocks 712 and 714 during a user session of the multimedia multi-user collaboration application may comprise a single training session. Such a training session in an embodiment may be repeated for several user sessions. Various media capture settings, A/V processing instruction adjustments, and offload settings may be applied, and in varying combinations with respect to one another, during these several user sessions. In such a way, the neural network may be trained to predict performance of the multimedia multi-user collaboration application (e.g., as measured by meeting metrics) in a plurality of varying conditions, as described by various combinations of different media capture settings, A/V processing instruction adjustments, and offload settings.

At block 718, the intelligent collaboration contextual session management system in an embodiment may transmit the trained neural network to the information handling system for which it has been trained for optimization of performance of the multimedia multi-user collaboration application at that information handling system during future user sessions. For example, in an embodiment described with respect to FIG. 5, upon training of the neural network unique to each information handling system (e.g., 500), the neural network may be ready to determine optimized settings for the information handling system for which it was trained, based on updated input values. In some embodiments, this determination may be made by the neural network operating at the intelligent collaboration contextual session management system 570, located remotely from the information handling system 500. In other embodiments, the trained neural network for information handling system 500 may be transmitted from the intelligent collaboration contextual session management system 570 to an agent 571 thereof, operating at the information handling system 500. The method for training the neural network in an embodiment may then end.

Figure 8:
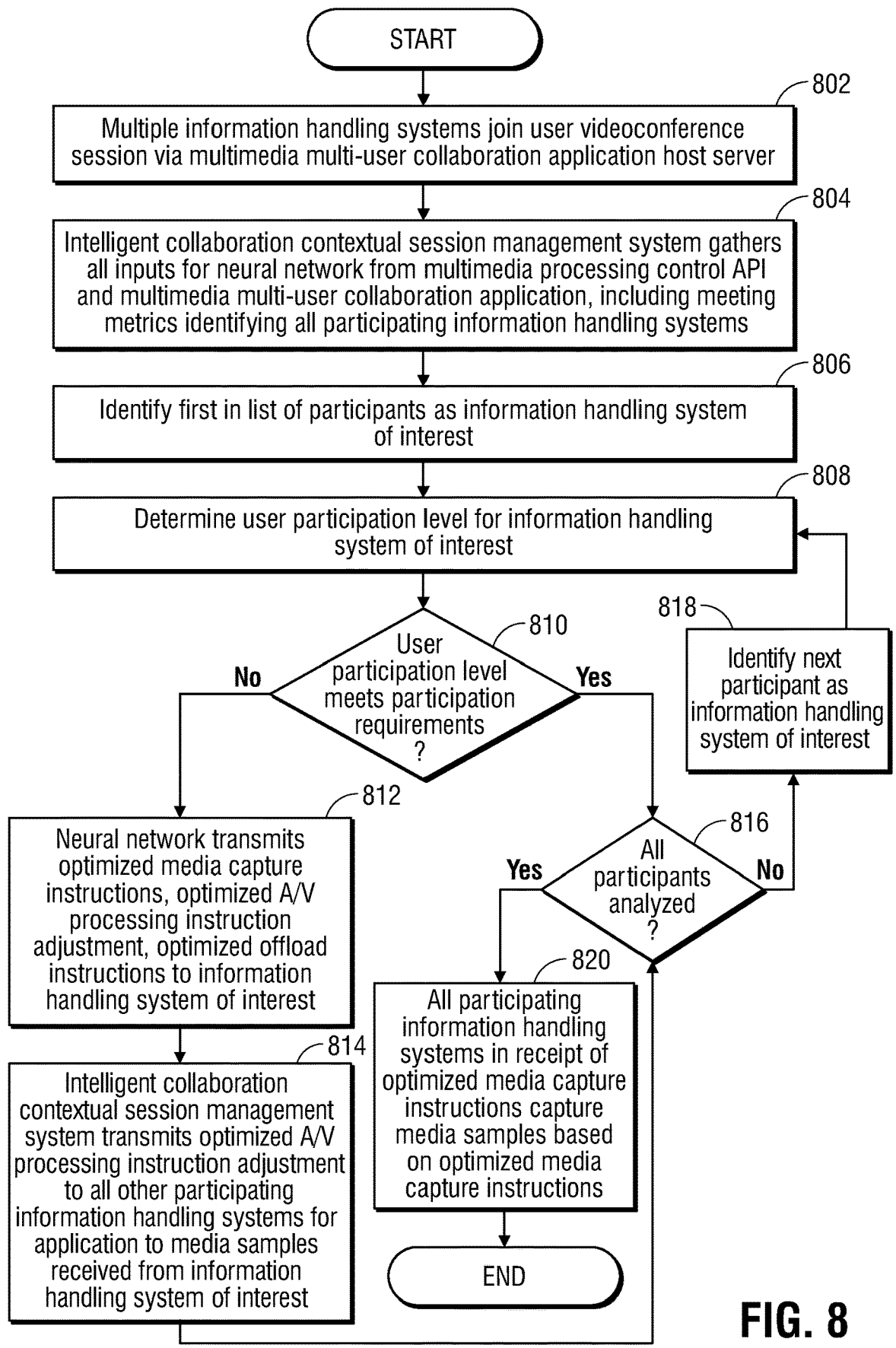
FIG. 8 is a flow diagram illustrating a method of determining optimized media capture instructions, audio/visual (A/V) processing instructions, or offload instructions for an information handling system according to an embodiment of the present disclosure.

FIG. 8 is a flow diagram illustrating a method of a trained neural network determining optimized media capture instructions, optimized A/V processing instruction adjustments, or optimized offload instructions for optimization of performance of the multimedia multi-user collaboration application during execution of a user session according to an embodiment of the present disclosure. As described in greater detail with respect to FIG. 7, a neural network may be trained to determine optimized media capture instructions, optimized A/V processing instruction adjustments, optimized offload settings, or a combination of some or all of these that is most likely to optimize performance of the multimedia multi-user collaboration application. Feeding input values gathered during a post-training user session into such a trained neural network in an embodiment may produce optimized media capture instructions, optimized A/V processing instruction adjustments, or optimized offload instructions designed to optimize performance of the multimedia multi-user collaboration application during execution of that later-joined user session at the information handling system.

At block 802, a plurality of information handling systems for which various neural networks have been trained may join a user videoconference session within the multimedia multi-user collaboration application in an embodiment. For example, in an embodiment described with reference to FIG. 6, a source information handling system 601 and a sink information handling system 602 may both join a videoconference user session via the multimedia multi-user collaboration application host server 653. The user session joined at block 802 in an embodiment may differ from the training user session described with reference to FIG. 7 in that the intelligent collaboration contextual session management system may modify default media capture settings, default A/V processing instruction module setting module settings, or default offload settings based on analysis by the trained neural network to optimize performance of the multimedia multi-user collaboration application operating at each of the participating information handling systems. In some embodiments, the user session begun at block 802 may be joined by any number of information handling systems greater than one. During the user session, each of the participating information handling systems that have joined the videoconference user session may initially capture media samples according to default media capture instructions in some embodiments at block 802.

The intelligent collaboration contextual session management system in an embodiment may gather all the inputs for the neural network from the multimedia processing control API and multimedia multi-user collaboration application at block 804. For example, the intelligent collaboration contextual session management system in an embodiment may repeat the method described with reference to blocks 704, 706, 708, 710, and 714 in an embodiment in order to gather current media capture settings, current A/V processing instruction modules, current offload settings, and the performance metrics for the multimedia multi-user collaboration application resulting from application of these settings, whether default or modified by previous application of the intelligent collaboration contextual session management session optimized settings, instructions or adjustments. The values gathered at block 804 may identify a number of participants, varying presentation displays, percentage of time users spend on mute, percentage of time users actively engage with the multimedia multi-user collaboration application (e.g., using a messaging service incorporated therewithin), identification of one or more users as a host, or identification of one or more users as sharing screens, for example. Additional inputs may include application of different types of backgrounds, application of different A/V processing instruction modules (e.g., eye contact correction, user framing, zoom and face normalizer, etc.), or use of different algorithms for various A/V processing instruction modules (e.g., compression, boundary detection, etc.) and the like detecting the state of participation of a user.

The values gathered at block 804 in an embodiment may include meeting metrics recorded by the multimedia multi-user collaboration application host server, or agents thereof operating at each of the participating information handling systems. For example, in an embodiment described with reference to FIG. 6, the multimedia multi-user collaboration application host server 653 may record meeting metrics for the user session joined by the plurality of information handling systems at block 802. These metrics may include an identification of all information handling systems (e.g.,

601 and 602) participating in the current videoconference user session, as well as indicators of user participation levels for users of each of these information handling systems (e.g., 601 and 602). Such indicators may include, for example, identification of one or more participating information handling systems (e.g., 601 or 602) currently muted, identified as hosts, sharing their screens, or actively talking in an embodiment. Other participation level indicators may be gathered from the sensor hubs (e.g., the multimedia processing control API 621 or 622) of each of the participating information handling systems (e.g., 601 and 602). Such sensor information in an embodiment may include, for example, IR camera (or other camera) detection of a user's presence within a certain distance from the information handling system (e.g., 601 or 602), determination whether the user's gaze is directed toward the GUI for the multimedia multi-user collaboration application (e.g., 651 or 652) as it is displayed via the display device (e.g., 613), or determination the user is actively engaging with the GUI for an application other than the multimedia multi-user collaboration application (e.g., 651 or 652).

At block 806, the intelligent collaboration contextual session management system in an embodiment may identify a first of the information handling systems identified as participating in the current videoconference user session as the information handling system of interest. For example, the intelligent collaboration contextual session management system 670 may identify the source information handling system 601 in an embodiment as the information handling system of interest. In such an example embodiment, the intelligent collaboration contextual session management system 670 may identify a neural network that has been trained specifically to optimize performance of the information handling system 601 (e.g., as described with reference to FIG. 7), for use in optimizing performance of the information handling system 601 during the current user session. In another example, the intelligent collaboration contextual session management system 670 may identify the sink information handling system 602 as the information handling system of interest. In such an example embodiment, the intelligent collaboration contextual session management system 670 may identify a neural network that has been trained specifically to optimize performance of the information handling system 602 (e.g., as described with reference to FIG. 7), for use in optimizing performance of the information handling system 602 during the current user session. In still other embodiments, the intelligent collaboration contextual session management system 670 may identify any of a plurality of other information handling systems that are currently participating in the videoconference session with information handling systems 601 and 602 via the multimedia multi-user collaboration application host server 653 as the information handling system of interest.

The intelligent collaboration contextual session management system in an embodiment may determine a user participation level for the information handling system of interest at block 808. User participation level may be, for example, the percentage of time the user has been on mute during the current user session in an embodiment. In another embodiment, the user participation level may be a percentage of time the user has directed her eye gaze toward the camera or the position of the multimedia multi-user collaboration application at its display location during the current user session. In still another embodiment, the user participation level may be a percentage of time the user has spent actively speaking or sharing her screen during the current user session. In yet another embodiment, the user participation level may be a percentage of time the user has interacted with a GUI for an application other than the multimedia multi-user collaboration application during the current user session. Other indicators of user participation in an embodiment may include detection of the user within a preset range of the information handling system of interest, as measured by an IR camera, proximity sensors, or the streaming video camera capturing the media samples shared as part of the videoconference user session.

In some embodiments, the user participation level may represent some combination of the user participation levels described directly above. For example, the user participation levels measured as a percentage of time during the current user session (e.g., time spent muted, time spent directing gaze toward camera, time spent actively speaking or sharing, or time interacting with a GUI for another application) may be represented in decimal form in a scale from negative one to positive one. In such an embodiment, time spent engaging with the multimedia multi-user collaboration application (e.g., time spent actively speaking, time spent sharing screens, time spent directing gaze toward multimedia multi-user collaboration application, or time spent providing input into multimedia multi-user collaboration application GUI) may be given a positive value between zero and positive one. Time spent not engaging with the multimedia multi-user collaboration application (e.g., user not detected within proximity to information handling system, user muted), or time spent actively engaging with other applications may be given a value between negative one and zero in such an embodiment. These various values may be averaged in such an embodiment in order to gauge overall user participation level. In some embodiments, one or more variables included within this determination may be weighted. For example, percentage of time the user spends muted may be given a lower weight than time the user spends actively engaging with the GUI for an application other than the multimedia multi-user collaboration application. In still other embodiments, one or more measures of user participation may override consideration of any other variables. For example, if the user is hosting the current user session, or currently sharing her screen, the user participation level may be set automatically to positive one, despite time the user has spent muted or actively engaging with the GUI for another application.

The intelligent collaboration contextual session management system may determine in an embodiment whether the user participation levels determined for the information handling system of interest meet preset threshold user participation level requirements at block 810. Processing resources consumed by the multimedia multi-user collaboration application at each of the participating information handling systems in an embodiment may be decreased by decreasing the size of the streaming audio and video samples capturing less active users, or by decreasing the number and complexity of A/V processing instruction modules performed on these streaming audio and video samples.

By decreasing the processing resources consumed in such a way, the performance of the multimedia multi-user collaboration application at a plurality of the participating information handling systems may be improved. Examples of performance issues that may be measured during execution of a shared videoconference user session between multiple information handling systems in an embodiment may include latency, jitter, and dropped packets. These issues may result from streaming of multiple large sized media samples to any one of the information handling systems participating in the shared videoconference user session in an embodiment due to the increased time required to receive such large sized media. Additionally, latency and jitter may result from application of more complex A/V processing instruction modules in an embodiment because they increase the time required to execute these A/V processing instruction modules on the received media sample prior to playback via a display or speaker. These delays in processing and transmission cause lags of varying degrees between the moment at which one participant is captured and the moment at which another participant views that captured media. When media samples capturing two separate participants are received at the information handling system of a third participant at different times, or are ready for playback at different times due to these varying degrees of lag, jitter, or non-synchronized playback may occur at the third participant's information handling system. Decreasing size of streaming audio and video samples may improve latency, jitter, the number of dropped packets, and bandwidth consumed during playback of a plurality of streaming audio and video samples received from each of the participating information handling systems.

Decreasing the number or complexity of A/V processing instruction modules applied to audio and video samples may decrease the processing resources required to perform such A/V processing instruction modules. Performance at the information handling system of interest may also be improved in an embodiment by balancing the processing resources consumed by the multimedia multi-user collaboration application across a plurality of processors at the information handling system of interest. If the determined user participation levels for the information handling system of interest do not meet preset threshold participation level requirements, the method may proceed to block 812 for adjustment of streaming audio and video sample size, adjustment of A/V processing instruction modules executed thereon, or offloading of some processing resource consumption to alternative processors. If the determined user participation levels for the information handling system of interest meet preset threshold participation level requirements, resolution and quality of audio and video samples may be prioritized, and the method may proceed to block 816 for potential optimization of other participating information handling systems.

At block 812, in an embodiment in which the determined user participation level for the information handling system of interest does not meet the preset threshold user participation level requirements, the trained neural network may determine optimized media capture instructions, optimized A/V processing instruction adjustments, or optimized offload instructions for optimizing performance of the multimedia multi-user collaboration application at each of the participating information handling systems. As described directly above, decreasing the size of the streaming audio and video samples captured at one participating information handling system via optimized media capture instructions may decrease latency, jitter, or the number of dropped packets experienced by each of the participating information handling systems. Similarly, decreasing the number or complexity of A/V processing instruction modules performed on these audio and visual samples, both at the information handling system of interest and at the other participating information handling systems may decrease the processing resources consumed at the information handling system of interest by the multimedia multi-user collaboration application. This may also decrease latency and jitter, as well as freeing up processing resources for execution of other applications at the information handling system of interest, thus improving overall performance of that information handling system. As described with reference to block 716 in FIG. 7, the trained neural network may accurately predict the relationship between media capture settings, A/V processing instruction modules, and various performance meeting metrics for the multimedia multi-user collaboration application. In an embodiment, the intelligent collaboration contextual session management system may input one or more default or current media capture settings, A/V processing instruction modules, default offload instructions, as well as one or more meeting metrics and sensor readings into the neural network.

One or more of the meeting metrics input into the neural network in such an embodiment may include a preset performance benchmark value, rather than the actual gathered or measured meeting metric value, in order to define a performance goal for the multimedia multi-user collaboration application. For example, the multimedia multi-user collaboration application may be consuming 30% of CPU resources at the time this value is gathered at block 804 in an embodiment. The intelligent collaboration contextual session management system in such an embodiment may input a capped value of 20%, instead of the actual measured value of 30% in order to indicate a desired performance benchmark that caps CPU resources consumed by the multimedia multi-user collaboration application at 20%. This is only one example of such a capped processing resource value. In other embodiments, the processing cap may apply to other processors (e.g., GPU, VPU, or GNA), or may have a different value (e.g., 10%). In other embodiments, a separate capped value may be applied to a plurality of processors. For example, the intelligent collaboration contextual session management system in an embodiment may input to the neural network a cap of 10% for the CPU, and 20% for the GPU. In still other embodiments, the processing cap may limit the total percentage of all processing power consumed by the multimedia multi-user collaboration application, combined. For example, the intelligent collaboration contextual session management system in an embodiment may input a cap into the neural network for the multimedia multi-user collaboration application to consume less than 50% of the processing resources of the CPU, GPU, VPU, and GNA combined. In yet another embodiment, the processing cap may limit the total percentage of processing power consumed at any of the plurality of processors by all applications executing on the information handling system of interest. For example, the intelligent collaboration contextual session management system may input into the neural network a cap of 20% total usage for the CPU of the information handling system of interest.

By inputting this value into the input layer of the neural network, the intelligent collaboration contextual session management system in an embodiment may then output one or more optimized media capture settings, optimized A/V processing instruction adjustments, or optimized offload instructions projected to achieve this performance benchmark. In other embodiments, various other performance benchmarks may be input into the neural network in the place of measured and known meeting metrics, including, for example, latency, jitter, or packet loss. In still other embodiments, a combination of two or more of such performance benchmarks may be input into the neural network in order to generate optimized media capture instructions, optimized A/V processing instruction adjustments, or optimized offload instructions (or combinations thereof) capable of achieving these plurality of performance benchmarks.

The intelligent collaboration contextual session management system trained neural network in an embodiment may transmit the optimized media capture instructions to the streaming media driver of the information handling system of interest. As described in greater detail with respect to FIG. 2, the streaming media driver 225 in an embodiment may direct the operation of the camera 222 and the microphone 224 such that media (e.g., images, video samples, audio samples) is captured according to the optimized media capture instructions. For example, the streaming media driver 225 in an embodiment may direct the camera 222 to capture images and generate video samples having the frames per second, zoom settings, pan settings, or number of key frames defined by the optimized video capture instructions. As another example, the streaming media driver 225 in an embodiment may direct the microphone 224 to capture and generate audio samples having the bitrate defined by the optimized audio capture instructions.

The multimedia processing control API for the information handling system of interest may transmit optimized audio capture settings, or optimized video capture settings to the streaming media driver, or to the multimedia framework pipeline and infrastructure platform, in various embodiments. For example, in an embodiment described with reference to FIG. 5, the multimedia processing control API 576 may transmit optimized media capture instructions (e.g., including optimized video capture instructions and optimized audio capture instructions) to the streaming media driver 525 or to the multimedia framework pipeline and infrastructure platform 540. As described herein, streaming media driver 525 may direct peripherally connected cameras or microphones to capture video and audio. The streaming media driver 525 in an embodiment may do so pursuant to instructions received from the multimedia framework pipeline and infrastructure platform 540. Thus, instructions for performing such capture of media samples (e.g., video or audio samples) in an embodiment may be stored at or executed by one or more of the multimedia framework pipeline and infrastructure platform 540 or the streaming media driver 525.

As another example, in an embodiment described with reference to FIG. 6 in which the source information handling system 601 is the information handling system of interest, the multimedia processing control API 621 may transmit these optimized media capture instructions, optimized A/V processing instruction adjustments, or optimized offload instructions to the streaming media driver 631 from the trained neural network. The streaming media driver 631 in such an embodiment may direct the camera 691 to capture video samples according to the optimized video capture settings and direct the microphone 692 to capture audio samples according to the optimized audio capture settings. In some embodiments, the optimized audio capture settings or optimized video capture settings may be transmitted from the multimedia processing control API 621 to the multimedia framework pipeline and infrastructure platform 641 instead.

In another example embodiment in which the source information handling system (e.g., 601) is the information handling system of interest, the intelligent collaboration contextual session management system 670 trained neural network may transmit optimized A/V processing instruction adjustments to the multimedia framework pipeline and infrastructure platform 641 of the information handling system of interest 601. As described herein, the multimedia framework pipeline and infrastructure platform may perform post-capture processing of media samples (e.g., video samples and audio samples). For example, in an embodiment described with reference to FIG. 5, the multimedia framework pipeline and infrastructure platform 540 may include an A/V processing instruction manager 541 directing the video processing engine 580 or audio processing engine 590 to perform various post-capture A/V processing instruction modules on previously captured media samples.

Optimized A/V processing instruction adjustments in an embodiment may direct the A/V processing instruction manager to include or exclude one or more specifically identified A/V processing instruction modules in an embodiment. For example, in an embodiment described with reference to FIG. 3, optimized A/V processing instruction adjustments for the source information handling system may exclude one or more of the algorithms executed by the eye contact correction module 381, the user framing module 382, the super resolution module 383, or the zoom and face normalizer module 384 from a queue of selected A/V processing instruction modules set for execution or application to a captured media sample. In another embodiment, optimized A/V processing instruction adjustments may further include identification of an optimized algorithm for execution within an A/V processing instruction, selected from a plurality of available choices for that A/V processing instruction. For example, the video compression module 385 may perform compression of a captured video sample using a less complex one of a plurality of available compression algorithms or codecs. As another example, an optimized A/V processing instruction adjustment may direct the A/V processing instruction manager to use a relatively less complex algorithm for eye contact correction, user framing, super resolution, zoom and face normalizing, virtual background application, or boundary detection.

Optimized A/V processing instruction adjustments in such an embodiment may identify a less complex available algorithm for execution, in order to avoid high consumption of processing resources resulting from execution of more complex compression algorithms. As described herein, decreasing processor resource consumption in such a way may improve performance of the multimedia multi-user collaboration application (e.g., by decreasing latency, jitter, dropped packets), and general performance of the information handling system of interest (e.g., by making more processing resources available for execution of applications other than the multimedia multi-user collaboration application).

In still another example, in an embodiment in which the source information handling system 601 is the information handling system of interest, the intelligent collaboration contextual session management system trained neural network may transmit optimized offload instructions to the to the multimedia processing control API (e.g., 621 or 622). The intelligent collaboration contextual session management system 670 may operate in some embodiments within the information handling system performance optimizer application 675, remotely from either the source information handling system 601 or the sink information handling system 602. In other example embodiments, the multimedia processing control API 621 may receive such optimized offload instructions or instructions output by such a first trained neural network operating at the source information handling system 601.

The intelligent collaboration contextual session management system in an example embodiment described with reference to FIG. 5 may transmit the optimized offload instructions generated as an output of the neural network to a multimedia processing control API 576. In some embodiments, the multimedia processing control API 576 may also transmit the offload instructions to the multimedia framework pipeline and infrastructure platform 540. In such an embodiment, optimized offload settings may cause the A/V processing instruction manager 541 to execute A/V processing instruction modules specifically identified within the optimized offload settings using one of a plurality of processors (e.g., CPU, GPU, VPU, GNA) specifically associated with that A/V processing instruction within the optimized offload settings. The optimized offload instruction may direct execution of one or more A/V processing instruction modules via a processor other than the CPU (or other default processor), in order to more efficiently distribute consumption of processing resources across a plurality of processors at the information handling system of interest. This may result in quicker processing time and greater processing resources being made available for applications other than the multimedia multi-user collaboration application, thus improving overall performance of both the multimedia multi-user collaboration application and the information handling system of interest, generally.

At block 814, the intelligent collaboration contextual session management system trained neural network may also transmit an optimized A/V processing instruction adjustment to all other participating information handling systems for application to media samples captured at and received from the information handling system of interest in an embodiment. The intelligent collaboration contextual session management system may utilize trained neural network outputs to optimize various settings for peripheral devices used in the capture at a source information handling system of media samples played across a plurality of sink information handling systems during user sessions for a multimedia multi-user collaboration application. For example, in an embodiment described with reference to FIG. 6, the information handling system 601 may be the information handling system of interest. In such an embodiment, the intelligent collaboration contextual session management system 670 may use a neural network trained for the information handling system 601 to optimize performance of the multimedia multi-user collaboration application 651 executing at the source information handling system 601. As another example, the information handling system 602 may be the information handling system of interest in an embodiment. In such an embodiment, the intelligent collaboration contextual session management system 670 may use a neural network trained for the information handling system 602 to optimize performance of the multimedia multi-user collaboration application 652 executing at the sink information handling system 602. Optimized media capture instructions, optimized A/V processing instruction adjustments, and optimized offload instructions generated at block 810 may be an example of such scenarios.

In still other embodiments, optimized A/V processing instruction adjustments output by a neural network trained for a first information handling system may be transmitted for execution or application at a second information handling system. For example, in an embodiment in which source information handling system 601 is the information handling system of interest, the neural network trained for information handling system 601 may output an optimized A/V processing instruction adjustment that adjusts the A/V processing applied to media samples captured at the source information handling system 601, and processed at the sink information handling system 602. As described herein, the sink information handling system 602 in an embodiment may perform one or more A/V processing instruction modules on media samples received from the source information handling system 601, such as, for example, application of a super resolution algorithm for artificially improving the resolution of the media sample captured at information handling system 601. In an embodiment in which the user participation level determined for the source information handling system 601 is determined at block 810 to fall below preset threshold user participation level requirements, the neural network trained for the source information handling system 601 may output an optimized A/V processing instruction adjustment to remove the super resolution algorithm from the queue of A/V processing instruction modules executed by the multimedia framework pipeline and infrastructure platform 642 at the sink information handling system 602, or may adjust the algorithm used to perform the super resolution. In such a way, the intelligent collaboration contextual session management system 670 may decrease processing resources consumed by the multimedia multi-user collaboration application 652 during processing of media samples captured at the source information handling system 601.

At block 816, the intelligent collaboration contextual session management system in an embodiment may determine whether all participating information handling systems have been analyzed. As described herein, the performance of each of the information handling systems participating in the videoconference session may be improved by optimizing one or more settings at only one of the participating information handling systems. For example, decreasing the size of streaming audio and video samples received from a plurality of remote participants may improve performance at a receiving or sink information handling system more than decreasing the size of streaming audio and video samples received from only one of the remote participants. Similarly, decreasing the number or complexity of A/V processing instruction modules received from a plurality of remote participants may improve performance at such as receiving or sink information handling system more than doing so at only one of the remote participants. This may be the case, in particular, where the optimized A/V processing instruction adjustment changes to a less complex algorithm the encoding method used to compress the audio or video sample at the source information handling system, and consequently changes the algorithm used to decompress the same audio or video sample when it is received at the sink information handling system. In order to fully optimize performance across each of the participating information handling systems, the intelligent collaboration contextual session management system may identify optimized media capture instructions, optimized A/V processing instruction adjustments, or optimized offload instructions for all information handling systems participating in the current videoconference user session that are associated with trained neural networks. If one or more of the information handling systems participating in the videoconference user session joined at block 802 have not yet been analyzed for such potential optimization by the intelligent collaboration contextual session management system, the method may move to block 818 for identification of a new information handling system of interest. If each of the participating information handling systems that are associated with trained neural networks have been analyzed for potential optimization, the method may proceed to block 820 for execution of such optimized media capture instructions, optimized A/V processing instruction adjustments, or optimized offload instructions.

In an embodiment in which one or more of the information handling systems participating in the videoconference user session have not yet been analyzed for such potential optimization, the intelligent collaboration contextual session management system may identify the next information handling system in the list of participating information handling systems received at block 804 that is also associated with a trained neural network as the information handling system of interest at block 818. For example, in an embodiment described with reference to FIG. 6, in which the intelligent collaboration contextual session management system has output from a first neural network optimized media capture instructions, optimized A/V processing instruction adjustments, or optimized offload instructions for the source information handling system 601, the intelligent collaboration contextual session management system may identify the sink information handling system 602, which is also associated with a second trained neural network, as the information handling system of interest. The method may then proceed back to block 808 to determine a user participation level for the new information handling system of interest. By repeating the loop between blocks 808 and 816 for each of the participating information handling systems that are also associated with a trained neural network, the intelligent collaboration contextual session management system in an embodiment may decrease processing resources consumed by the multimedia multi-user collaboration application at each of the participating information handling systems, and significantly increase performance.

At block 820, all participating information handling systems in receipt of optimized media capture instructions may capture media samples based on the optimized media capture instructions. For example, one or more of the participating information handling systems whose users do not meet the preset participation requirements described with reference to block 810 may receive optimized media capture instructions at block 812. A plurality of the information handling systems participating in the videoconference user session joined at block 802 may receive such optimized media capture instructions in some embodiments. Information handling systems participating in the videoconference user session that did not receive such optimized media capture instructions (e.g., because the user meets the preset participation requirements, or because the information handling system is not associated with a trained neural network) may continue to capture media samples according to default media capture instructions, as described with reference to block 802.

The camera in an embodiment may capture a video sample pursuant to the optimized video capture instructions, and the microphone may capture the audio sample pursuant to the optimized audio capture instructions. For example, in an embodiment described with respect to FIG. 6, the streaming media driver 631 in such an embodiment may direct the camera 691 to capture video samples according to the optimized video capture settings and direct the microphone 692 to capture audio samples according to the optimized audio capture settings. In another example embodiment described with reference to FIG. 4, the streaming media driver 425 (or other drivers) may execute optimized media capture instructions received from the A/V processing instruction manager 441 to instruct capture of video samples via one or more cameras and capture of audio samples via one or more microphones of information handling system 400. Decreasing the frames per second, number of key frames, or bitrate according to the optimized media capture instructions in an embodiment may cause the size of streaming media captured to decrease, which may decrease the processing power required to process such captured media samples and bandwidth needed to transmit such processed media samples. In such a way, the intelligent collaboration contextual session management system using a trained neural network in an embodiment may determine and apply optimized media capture instructions, optimized A/V processing instruction adjustments, or optimized offload instructions for a plurality of information handling systems participating in a videoconference user session with one another, based on performance levels of each of the participants. The method for determining optimized media capture instructions, optimized A/V processing instruction adjustments, or optimized offload instructions may then end.

Figure 9:
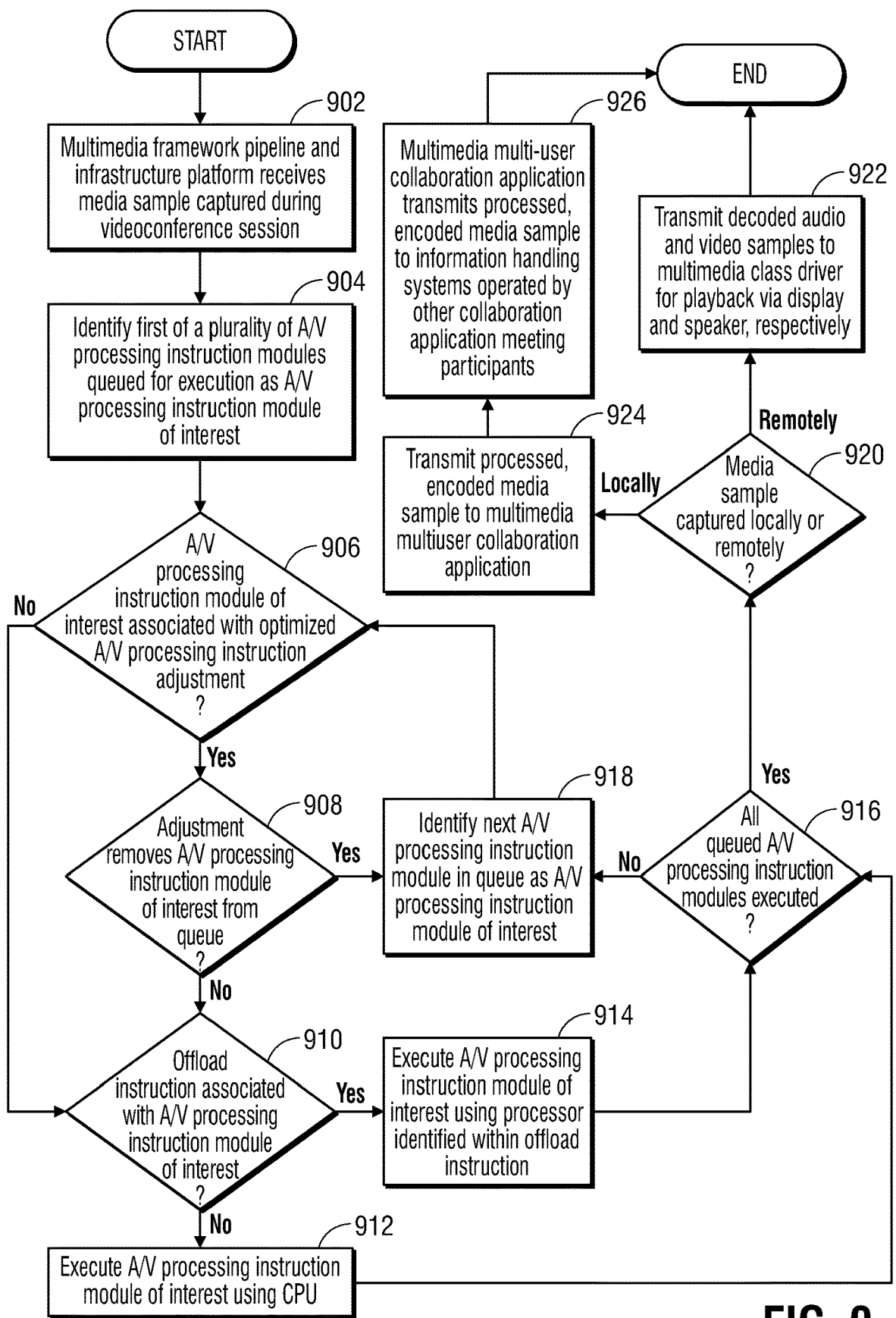
FIG. 9 is a flow diagram illustrating a method of applying optimized A/V processing instruction adjustments or optimized offload instructions to optimize performance of the multimedia multi-user collaboration application according to an embodiment of the present disclosure.

FIG. 9 is a flow diagram illustrating a method of applying optimized A/V processing instruction adjustments or optimized offload instructions determined by the trained neural network within a videoconference user session to optimize performance of the multimedia multi-user collaboration application or of the information handling system executing the application according to an embodiment of the present disclosure. As described herein, the neural network may be trained to optimize performance of the multimedia multi-user collaboration application across a plurality of information handling systems participating in a shared videoconference user session in an embodiment. Application of the optimized instructions generated by the trained neural network in an embodiment may adjust methods used to capture, and process media samples, as well as balance consumption of processing resources across a plurality of processors, so as to optimize performance of the multimedia multi-user collaboration application or performance of any of the participating information handling systems during user sessions.

At block 902, the multimedia framework pipeline and infrastructure platform at one of the information handling systems participating in a joint videoconference user session in an embodiment may receive a captured media sample. The captured media sample received at the multimedia framework pipeline and infrastructure platform in an embodiment may be a media sample captured locally at the same information handling system executing the multimedia framework pipeline and infrastructure platform, or it may be a remotely captured media sample received from another participating information handling system via the multimedia multi-user collaboration application host server.

In an embodiment in which the media sample is locally captured, the information handling system executing the multimedia framework pipeline and infrastructure platform may capture an audio sample or video sample according to either default media capture instructions (e.g., as described with reference to block 802 of FIG. 8), or according to optimized media capture instructions (e.g., as described with reference to block 818 of FIG. 8). For example, in an embodiment described with reference to FIG. 6, the camera 691 of the source information handling system 601 may capture a video sample pursuant to optimized video capture instructions, and the microphone 692 may capture the audio sample pursuant to the optimized audio capture instructions.

The captured video sample and audio sample may be transmitted to the A/V processing instruction manager in an embodiment. For example, in an embodiment described with reference to FIG. 4, the streaming media driver 425 (or other drivers) may transmit the captured video and audio samples to the A/V processing instruction manager 441 via a device proxy 442, which may route or map connections between physical pins of the streaming media driver 425 (or other drivers) and the A/V processing instruction manager 441. As another example, in an embodiment described with reference to FIG. 3, the streaming media driver 324 may receive video or audio samples captured by peripheral cameras or microphones in communication therewith, according to the optimized media capture instructions. In another embodiment, the audio driver 329 may receive audio samples captured by a microphone in communication therewith, according to such received optimized media capture instructions. The streaming media driver 325 may transmit video or audio samples received in such a way to the A/V processing instruction manager 341 in an embodiment. In other embodiments, the A/V processing instruction manager 341 may receive an audio sample from the audio driver 329. Such media samples captured according to optimized media capture instructions may have reduced streaming size, which may decrease the processing resources consumed by the processor information handling system 300 executing code instructions of each of the modules (e.g., 381, 382, 383, 384, 385, and 386).

In an embodiment in which the media sample is remotely captured, the sink information handling system may receive the remotely captured media sample, which may have been captured at the source information handling system according to either default media capture instructions (e.g., as described with reference to block 802 of FIG. 8), or according to optimized media capture instructions (e.g., as described with reference to block 818 of FIG. 8). For example, in an embodiment described with reference to FIG. 6, the sink information handling system 602 may receive a media sample captured at the source information handling system 601 according to either default or optimized media capture instructions (e.g., as described directly above). The sink information handling system 602 may receive such a media sample via the multimedia multi-user collaboration application host server 653 and the agent thereof 652 operating at the sink information handling system 602.

In another example embodiment described with reference to FIG. 4, in which the multimedia multi-user collaboration application 450 acts as the media sink, the multimedia multi-user collaboration application 450 may retrieve a processed and encoded media sample from a URI within network 407, via the network interface device 409. Because such media samples may have been captured according to optimized media capture instructions, they may have reduced streaming size. Returning to the example described with reference to FIG. 6, this may decrease the bandwidth consumed in the process of receiving the remotely captured media sample at the sink information handling system 602, and reduce processing resources consumed by the processor of the sink information handling system 602. In such a way, optimizing media capture instructions may improve performance at the source information handling system 601, and across a plurality of other participating sink information handling systems (e.g., 602) in an embodiment.

At block 904, a first of a plurality of A/V processing instruction modules queued for execution, as managed by the A/V processing instruction manager, may be identified as the A/V processing instruction module of interest in an embodiment. As described herein, the multimedia framework pipeline and infrastructure platform may perform one or more processing methods on the media sample, audio sample, or video sample received at block 902. For example, in an embodiment described with reference to FIG. 4 in which a locally captured audio sample and a locally captured video sample are received at block 902, the A/V processing instruction manager 441 may apply one or more A/V processing instruction modules to the retrieved sample, in a preset order (e.g., from 443-1 to 443-n). At block 906, the intelligent collaboration contextual session management system may identify the first queued A/V processing instruction (e.g., 443-1) as the A/V processing instruction module of interest in such an example embodiment.

In another example embodiment in which a remotely captured media sample is received at block 902, the A/V processing instruction manager 441 may apply one or more A/V processing instruction modules to the remotely captured media sample in a reverse order (e.g., from 443-n to 443-1). At block 906 in such an example embodiment, the intelligent collaboration contextual session management system may identify the first queued A/V processing instruction (e.g., 443-n) as the A/V processing instruction module of interest. The A/V processing instruction module of interest 443-n in such an example embodiment may include a demultiplexing algorithm for splitting of the processed and encoded media sample into a compressed audio sample and a compressed video sample.

The A/V processing instruction manager in an embodiment may determine at block 906 whether the A/V processing instruction module of interest is identified within the received A/V processing instruction adjustment generated by the trained neural network. The A/V processing instruction modules executed by the multimedia framework pipeline and infrastructure platform in such an embodiment may be adjusted based on the optimized A/V processing instruction adjustments generated by the neural network described herein. Further, the A/V processing instruction adjustments in an embodiment may adjust the algorithm used in the A/V processing instruction module of interest to a less complex algorithm that requires lower computing overhead. These optimized media capture instructions, optimized A/V processing instruction adjustments, or optimized offload instructions and instructions may decrease the load on the CPU or other processors of the information handling system executing the A/V processing instruction module of interest.

Such optimized A/V processing instruction adjustments in an embodiment may be applied to locally captured media samples received at block 902, for example, if the user captured in such locally captured media samples demonstrates a low level of participation in the current videoconference user session (e.g., as described with reference to block 808 of FIG. 8). In other embodiments in which the media sample received at block 902 was remotely captured at another participating information handling system, such optimized A/V processing instruction adjustments may be applied to the remotely captured media sample, for example, if the user of the remote information handling system that captured the remotely captured media sample demonstrates a low level of participation. In either of such scenarios, improving performance of the source information handling system capturing these media samples may be prioritized over the quality of the captured media samples, or improvement thereof by application of default A/V processing instruction module settings. If the A/V processing instruction module of interest is associated with an optimized A/V processing instruction adjustment, the method may proceed to block 908 to determine whether the adjustment removes or alters the default settings for an A/V processing instruction module of interest. If the A/V processing instruction module of interest is not associated with an optimized A/V processing instruction adjustment, this may indicate that improving quality of the captured media sample justifies the consequent processor resource consumption, and the method may proceed to block 910 to determine whether the processor resource consumption associated therewith may be distributed more evenly across a plurality of processors.

At block 908, in an embodiment in which the user captured in the media sample received at block 902 demonstrates a low level of participation, the A/V processing instruction manager may determine whether the A/V processing instruction adjustment removes the A/V processing instruction module of interest from the queue of instructions set for application to the received media sample. Optimized A/V processing instruction adjustments in some embodiments may remove one or more A/V processing instruction modules from the queue of methods that the A/V processing instruction manager would normally execute under default conditions. Thus, pursuant to the optimized A/V processing instruction adjustments, the A/V processing instruction manager may skip execution of one or more default A/V processing instruction module settings, or remove such default A/V processing instruction module settings from the queued list of A/V processing instruction modules for execution by the A/V processing instruction manager. Such default A/V processing instruction module settings may include, for example, in an embodiment described with respect to FIG. 3, algorithms or methods executed by the eye contact correction module 381, the user framing module 382, the super resolution module 383, or the zoom and face normalizer module 384. Other embodiments may include, for example, A/V processing instruction modules for boundary detection of a user within a captured video sample, or application of a virtual background surrounding the user within such captured video samples. One or more of these default settings to execute the A/V processing instruction modules (e.g., eye contact correction, user framing, super resolution, zoom and face normalization, boundary detection, or virtual background application) may be removed from the list of A/V processing instruction modules for execution by the A/V processing instruction manager by excluding it from the optimized A/V processing instruction adjustment in an embodiment.

By skipping execution of one or more of these algorithms, the intelligent collaboration contextual session management system may direct post-capture processing designed to minimize or decrease CPU or other processor usage. If the A/V processing instruction adjustment removes the A/V processing instruction module of interest from the queue of A/V processing instruction modules set for application to the received media sample, the method may proceed to block 918, for identification of the next available A/V processing instruction module of interest. If the A/V processing instruction adjustment does not remove the A/V processing instruction module of interest from the queue of A/V processing instruction modules set for application to the received media sample, the method may proceed to block 910 to determine whether the processor resources consumed during execution of the A/V processing instruction module of interest may be distributed more evenly across a plurality of processors.

At block 910, the A/V processing instruction manager may determine whether an optimized offload instruction received from the trained neural network identifies the A/V processing instruction module of interest in an embodiment. An optimized offload instruction may be output by the neural network by itself, or in conjunction with an optimized A/V processing instruction adjustment. For example, in an embodiment in which the neural network does not output an optimized A/V processing instruction adjustment, because improving quality of the captured media sample justifies the consequent processor resource consumption, the neural network may output an optimized offload instruction for mitigating the consequent processor resource consumption by spreading the consumption across a plurality of processors.

As another example, in an embodiment in which the neural network outputs an optimized A/V processing instruction adjustment for decreasing the processor resources consumed during execution of the A/V processing instruction module of interest, the neural network may also output an optimized offload instruction for further improving performance of the information handling system executing these instructions by spreading the consumption across a plurality of processors.

The load on any single processor (e.g., CPU, GPU, VPU, GNA) of the information handling system executing the A/V processing instruction module of interest in an embodiment may be decreased by directing the A/V processing instruction manager to engage alternate processors to execute various A/V processing instruction modules. For example, in an embodiment in which the A/V processing instruction module of interest is by default executed by the CPU, the A/V processing instruction manager may engage the GPU, VPU, or GNA (e.g., as identified within the optimized offload instruction) to execute the A/V processing instruction module of interest. As another example, in an embodiment in which the A/V processing instruction module of interest is by default executed by the GPU, the A/V processing instruction manager may engage the VPU, or GNA (e.g., as identified within the optimized offload instruction) to execute the A/V processing instruction module of interest.

Optimized offload instructions received at the A/V processing instruction manager in an embodiment may identify such an alternative processor, and associate this alternative processor with one or more of the A/V processing instruction modules identified within the optimized A/V processing instruction adjustment. If an optimized offload instruction has not been received, or if the received offload instruction does not identify the A/V processing instruction module of interest, the method may proceed to block 912 for execution of the A/V processing instruction module of interest via the CPU or other default processor (e.g., GPU). If a received offload instruction identifies the A/V processing instruction module of interest, the method may proceed to block 914 for the A/V processing instruction manager to execute the A/V processing instruction module of interest by a processor other than the CPU or other default processor (e.g., GPU), as also identified within the received optimized offload instruction.

The A/V processing instruction manager may engage the video processing engine or audio processing engine to perform the A/V processing instruction module of interest using the CPU or other default processor at block 912 in an embodiment in which no offload instructions have been received identifying the A/V processing instruction module of interest. As described herein, the A/V processing instruction manager in an embodiment may, by default or in the absence of optimized offload instructions to the contrary, execute each of the queued A/V processing instruction modules via the CPU or another default processor (e.g., GPU). If the A/V processing instruction manager in an embodiment has not received such an optimized offload instruction, the CPU or other default processor may be used to execute the A/V processing instruction module of interest. Similarly, if an optimized offload instruction has been received, but it does not specifically associate the A/V processing instruction module of interest with an alternative processor (e.g., GPU, VPU, GNA), the A/V processing instruction manager may, by default, execute the A/V processing instruction module of interest via the CPU. This may occur, for example, if an optimized offload instruction associated with an A/V processing instruction other than the A/V processing instruction module of interest identified at block 904 has been received.

As described herein, the optimized A/V processing instruction adjustments in an embodiment may adjust the algorithm used in the A/V processing instruction module of interest to an algorithm that requires lower computing overhead than the algorithm used in the default A/V processing instruction module setting. The A/V processing instruction manager in an embodiment may execute the A/V processing instruction module of interest, via the CPU, using such a specifically identified algorithm in such an embodiment, in accordance with the A/V processing instruction adjustments. For example, the optimized A/V processing instruction adjustment may specifically identify the least complex (or less complex) of a plurality of video compression algorithms supported by the H.264 video coding standard, as described herein. As another example, the optimized A/V processing instruction adjustment may specifically identify the least complex (or less complex) of a plurality of audio compression algorithms supported by part 3 of the MPEG-4 standard, as described herein. In still another example, the optimized A/V processing instruction adjustment may specifically identify the least complex (or less complex) of a plurality of boundary detection algorithms used to determine the outlines of a user's image within video samples prior to application of a virtual background in such video samples. By using the less complex algorithms identified within such A/V processing instruction adjustments in an embodiment, the processing power consumed during execution thereof may be decreased. This may result in a consequent improvement in performance of the information handling system executing such adjusted A/V processing instruction modules, and of the multimedia multi-user collaboration application executing at that information handling system. In such way, the A/V processing instruction manager may decrease the processing load on the CPU or other default processor. The method may then proceed to block 916 to determine whether all A/V processing instruction modules queued for execution by the A/V processing instruction manager have been executed.

At block 914, in an embodiment in which an optimized offload instruction identifying the A/V processing instruction module of interest has been received, the A/V processing instruction manager may engage the video processing engine or audio processing engine to perform the A/V processing instruction module of interest using the processor (e.g., other than the CPU) identified within the offload instruction. For example, in an embodiment described with reference to FIG. 4, an optimized offload instruction may associate VPU 413 with an A/V processing instruction 443-1 for the user framing module, super resolution module, zoom and face normalizer module, or eye contact correction modules using convolutional neural networks. As another example, the optimized offload instruction may associate the GNA 414 with A/V processing instruction 443-1 for the background noise reduction module. In yet another example, the optimized offload instructions may associate GPU 412 with A/V processing instruction 443-1 for the eye contact correction module, user framing module, super resolution module, or zoom and face normalizer module. In other embodiments in which the A/V processing instruction module of interest is oriented at or closer to the bottom of the queued list of A/V processing instruction modules (e.g., 443-n), the optimized offload instructions may associate GPU 412 with execution of the video compression module, for example.

The A/V processing instruction manager in an embodiment may engage such an alternate processors (e.g., GPU, VPU, GNA) to execute either a default A/V processing instruction module of interest or an adjusted A/V processing instruction module of interest. For example, in an embodiment in which it is determined at block 906 that the A/V processing instruction module of interest is not associated with an optimized A/V processing instruction adjustment, the A/V processing instruction manager may execute the default A/V processing instruction module of interest, including a more complex algorithm, via the alternative processor identified within the optimized offload instruction. This may occur in an embodiment in which improving quality of the captured media sample justifies the consequent processor resource consumption. By directing the A/V processing instruction manager to execute the default A/V processing instruction module setting, including the more complex algorithm, according to the optimized offload instruction in such a way, the intelligent collaboration contextual session management system in an embodiment may mitigate the consequent processor resource consumption by spreading the consumption across a plurality of processors.

As another example, in an embodiment in which the A/V processing instruction module of interest is determined at block 908 to be associated with an optimized A/V processing instruction adjustment to the algorithm used, the A/V processing instruction manager may execute the less complex algorithm identified within the optimized A/V processing instruction adjustment via the alternative processor identified within the optimized offload instruction. By directing the A/V processing instruction manager to execute the A/V processing instruction according to the optimized A/V processing instruction adjustment and the optimized offload instruction in such a way, the intelligent collaboration contextual session management system in an embodiment may further improve performance of the information handling system executing these instructions by spreading the consumption across a plurality of processors.

The A/V processing instruction manager in an embodiment may determine whether each of the A/V processing instruction modules queued for processing of the received media sample have been executed at block 916. For example, in an embodiment described with reference to FIG. 4 in which the media sample has been captured locally by the information handling system 400 executing the A/V processing instruction modules (e.g., 443-1, 443-2, or 443-n), the A/V processing instruction manager may determine whether the A/V processing instruction 443-n, or the last of the queued A/V processing instruction modules has been executed. In another example embodiment in which the media sample has been captured at an information handling system located remotely from the information handling system 400 executing the A/V processing instruction modules (e.g., 443-1, 443-2, or 443-n), the A/V processing instruction manager may determine whether the A/V processing instruction 443-1, or the last of the queued A/V processing instruction modules has been executed. If one or more of the A/V processing instruction modules queued for processing of the captured media sample have not yet been executed, the method may proceed to block 918 for identification of the next A/V processing instruction module of interest. If each of the A/V processing instruction modules queued for processing of the captured media sample have been executed, the method may proceed to block 920 for transmission of the resulting processed, encoded media sample.

At block 918, in an embodiment in which one or more of the A/V processing instruction modules queued for processing of the received media sample have not yet been executed, the A/V processing instruction manager may identify the next A/V processing instruction in the queue as the A/V processing instruction module of interest. For example, in an embodiment described with reference to FIG. 4 in which the media sample has been captured locally by the information handling system 400 executing the A/V processing instruction modules (e.g., 443-1, 443-2, or 443-*n*) and the A/V processing instruction module of interest is 443-1, the A/V processing instruction manager may identify A/V processing instruction 443-2 as the A/V processing instruction module of interest at block 918. As another example, in an embodiment in which the media sample has been captured at an information handling system located remotely from the information handling system 400 executing the A/V processing instruction modules (e.g., 443-1, 443-2, or 443-*n*) and the A/V processing instruction module of interest is 443-2, the A/V processing instruction manager may identify A/V processing instruction 443-1 as the A/V processing instruction module of interest at block 918.

The method may then proceed back to block 906 to determine whether the new A/V processing instruction module of interest is identified within an A/V processing instruction adjustment. By repeating the loop between blocks 906 and 918 in an embodiment, the A/V processing instruction manager may decrease processing resources consumed during application of A/V processing instruction algorithms to media samples recording less active participants, or more efficiently distribute processing tasks associated with execution of those algorithms across a plurality of processors. These adjustments to default operations of the multimedia multi-user collaboration application may optimize performance of the information handling system executing the A/V processing instruction modules on the received media sample, as well as performance of the multimedia multi-user collaboration application executed thereon.

As described above with reference to block 902, the received media sample to which such A/V processing instruction algorithms (e.g., default or adjusted) are applied may be locally captured by the information handling system executing the A/V processing instruction modules, or may be remotely captured at another information handling system and received via the multimedia multi-user collaboration application host server. For example, in an embodiment described with reference to FIG. 6, the media sample received at block 902, to which A/V processing instruction algorithms (e.g., default or adjusted) are applied by the multimedia framework pipeline and infrastructure platform 641 may be locally captured by the camera 691 of the source information handling system 601. In another example embodiment, the media sample received at block 902, to which A/V processing instruction algorithms are applied by the multimedia framework pipeline and infrastructure platform 642 may be remotely captured by the camera 691 of the source information handling system 601, and received via the multimedia multi-user collaboration application host server 653 at the sink information handling system 602 at which the A/V processing instruction modules will be executed. Because the method described by the loop between blocks 906 and 918 may be applied at the source information handling system 601 to either media samples captured locally or at the sink information handling system 602 to media samples captured remotely (e.g., at the source information handling system 601), the method so described may optimize performance at both the source information handling system 601 and each of a plurality of sink information handling systems (e.g., 602) in an embodiment.

At block 920, the A/V processing instruction manager in an embodiment may determine whether the media sample has been captured locally or remotely. Following application of all queued A/V processing instruction modules to the media sample received at the multimedia framework pipeline and infrastructure platform (either from a remotely located information handling system or from a camera or microphone of the information handling system executing the multimedia framework pipeline and infrastructure platform), the platform may either display the media sample via a display device, or transmit the processed media sample for playback at a remote information handling system. If the media sample received at the multimedia framework pipeline and infrastructure platform was captured locally (e.g., by a camera or microphone of the information handling system executing the multimedia framework pipeline and infrastructure platform), the method may proceed to block 924 for transmission of the processed media sample to a remote information handling system. If the media sample received at the multimedia framework pipeline and infrastructure platform was captured remotely (e.g., from a remotely located information handling system), the method may proceed to block 922 for transmission of audio and video samples decoded and demultiplexed from the received media sample (e.g., during execution of the A/V processing instruction modules described herein) for playback via a video display and speaker, respectively.

In an embodiment in which the media sample received by the multimedia multi-user collaboration application at block 902 was captured remotely, the A/V processing instruction manager may transmit the decoded audio and video samples to the multimedia class driver for playback via the display and speaker, respectively, at block 922. For example, in an embodiment described with reference to FIG. 6, the video sample demultiplexed and decoded from the processed and encoded media sample retrieved from the multimedia multi-user collaboration application 652 in an embodiment may be transmitted to the streaming media driver 682 for playback of the video via the digital display 613 of the information handling system 602. In another aspect of such an embodiment, the audio sample demultiplexed and decoded from the processed and encoded media sample retrieved from the multimedia multi-user collaboration application 652 may be transmitted to the streaming media driver 682 for playback of the audio via an operably connected speaker 614 of the information handling system 602.

In an embodiment in which the media sample received at block 902 was captured locally, the A/V processing instruction manager may transmit the processed, encoded media sample to the multimedia multi-user collaboration application at block 924. For example, in an embodiment described with reference to FIG. 6, the A/V processing instruction manager of the multimedia framework pipeline and infrastructure platform (e.g., 641) at the source information handling system (e.g., 601) may perform several A/V processing instruction modules on incoming audio and video samples, including encoding and multiplexing of these samples to form a processed, encoded media sample. In such an embodiment, the processed, encoded media sample may be then be forwarded to the multimedia multi-user collaboration application 651 for transmission (e.g., via a network) to the multimedia multi-user collaboration application 652 at the sink information handling system 602.

The multimedia multi-user collaboration application in an embodiment may transmit the processed, encoded media sample to one or more remotely located information handling systems also participating in the same user session of the multimedia multi-user collaboration application at block 926. For example, in an embodiment described with reference to FIG. 4, the processed and encoded media sample may be transmitted or streamed to the multimedia multi-user collaboration application 450, where it will be streamed to a URI in the network 407 via the network interface device 409. In an embodiment in which the locally captured media sample was captured pursuant to optimized media capture instructions (e.g., as described with reference to block 818 of FIG. 8), the resulting decrease in streaming media size may decrease the bandwidth consumed at both the source information handling system transmitting the locally captured media sample, and the remotely located sink information handling systems receiving the media sample. In such a way, the intelligent collaboration contextual session management system may direct capture and processing of media samples during a videoconference user session shared amongst a plurality of information handling systems so as to optimize performance at one or more of these participating information handling systems. The method of applying optimized instructions to optimize performance of the multimedia multi-user collaboration application or of the information handling system executing the application may then end.

The blocks of the flow diagrams of FIGS. 7, 8, and 9, or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system executing an intelligent collaboration contextual session management system, comprising:
    a processor to execute code instructions of a multimedia multi-user collaboration application to join a videoconference session with a remotely located computing device;
    a display screen and a speaker;
    a video camera and a microphone;
    a sensor hub detecting participation of a user in the videoconference session;
    the processor to execute code instructions to input sensor data indicating participation of the user in the videoconference session to a trained neural network of the intelligent collaboration contextual session management system and to output optimized media capture instructions from the trained neural network of the intelligent collaboration contextual session management system to the video camera predicted to adjust performance of the multimedia multi-user collaboration application at the information handling system to meet a preset performance benchmark value of meeting metrics relating to information handling system resources consumed by the multimedia multi-user collaboration application during the videoconference session;
    the video camera configured to capture a video sample of the videoconference session, based on the optimized media capture instructions, in response to the detected sensor data indicating participation of the user; and
    a network interface device configured to transmit a processed, encoded media sample, including the captured video sample to the remotely located computing device participating in the videoconference session.

2. The information handling system of claim 1, wherein the preset performance benchmark value is a capped percentage of the processor's power being used by the multimedia multi-user collaboration application, running at the information handling system during the videoconference session.

3. The information handling system of claim 1, wherein the preset performance benchmark value is a capped measurement of time elapsing between the network interface device transmitting the processed, encoded media sample and the remotely located computing device receiving the processed, encoded media sample.

4. The information handling system of claim 1 further comprising:
    the processor to execute code instructions for the trained neural network to output an optimized A/V processing instruction adjustment adjusting a default A/V processing instruction module setting, in response to the detected sensor data indicating participation of the user; and
    the processor to execute the optimized A/V processing instruction adjustment to adjust selection of a virtual background applied by the default A/V processing instruction module setting.

5. The information handling system of claim 1 further comprising:
    the processor to execute code instructions for the trained neural network to output an optimized A/V processing instruction adjustment adjusting a default A/V processing instruction module setting, in response to the detected sensor data indicating participation of the user; and
    the processor to execute the optimized A/V processing instruction adjustment to adjust selection of a boundary detection algorithm applied by the default A/V processing instruction module setting.

6. The information handling system of claim 1, wherein the camera is configured by the optimized media capture instructions to capture the video sample at an adjusted resolution.

7. The information handling system of claim 1 further comprising:
the microphone configured to capture an audio sample for the media sample of the videoconference session, based on the optimized media capture instructions, wherein the optimized media capture instructions defines a bit rate at which the audio sample is captured.

8. A method for intelligently managing a collaboration videoconference session for an information handling system, comprising:
executing code instructions of a multimedia multi-user collaboration application, via a first processor, to join a videoconference session of a remotely located computing device;
receiving and inputting into a trained neural network, meeting metrics gathered by the multimedia multi-user collaboration application, detected levels of user participation in the videoconference session, default media capture instructions, and default audio/visual (A/V) processing instruction module settings;
executing code instructions of the trained neural network, via the first processor, and to output an optimized offload instruction for balancing processing resources consumed during execution of the videoconference session across a plurality of processors of the information handling system, including the first processor, wherein the optimized offload instruction is predicted to adjust performance of the multimedia multi-user collaboration application, measured at the information handling system by one or more meeting metrics, to meet a preset performance benchmark value of the information handling system function, during the videoconference session of the multimedia multi-user collaboration application;
multiplexing together a video sample and audio sample, captured at a video camera and a microphone of the information handling system, respectively, via the first processor, to form a multiplexed media sample;
executing code instructions for an A/V processing instruction module, via a second processor as adjusted away from the first processor by the optimized offload instruction, to transform the multiplexed media sample into a processed, encoded media sample; and
transmitting the media sample to the remotely located computing device participating in the videoconference session, via a network interface device.

9. The method of claim 8, wherein the first processor is a central processing unit (CPU), and the preset performance benchmark value is a percentage of CPU availability used by the multimedia multi-user collaboration application, during the videoconference session.

10. The method of claim 8 further comprising:
determining an optimized A/V processing instruction adjustment adjusting a default A/V processing instruction module setting, via the neural network, in response to the detected sensor data indicating participation of the user; and
executing the optimized A/V processing instruction adjustment to adjust selection of an audio compression algorithm by the default A/V processing instruction module setting.

11. The method of claim 8 further comprising:
determining an optimized A/V processing instruction adjustment adjusting a default A/V processing instruction module setting, via the neural network, in response to the detected sensor data indicating participation of the user; and
executing the optimized A/V processing instruction adjustment to adjust selection of a video compression algorithm by the default A/V processing instruction module setting.

12. The method of claim 8, wherein the second processor is a graphics processing unit (GPU).

13. The method of claim 8, wherein the second processor is a vision processing unit (VPU).

14. The method of claim 8, wherein the second processor is a Gaussian Neural Accelerator (GNA).

15. An information handling system executing an intelligent collaboration contextual session management system, comprising:
a processor to execute code instructions for a multimedia multi-user collaboration application to join a videoconference session with a remotely located computing device;
a display screen and a speaker;
a video camera to capture a locally captured vide sample;
a microphone to capture a locally captured audio sample;
a sensor hub detecting participation of an information handling system user in the videoconference session;
a processor to execute code instructions for a trained neural network of the intelligent collaboration contextual session management system to output a first optimized A/V processing instruction adjustment predicted to adjust performance of the information handling system while executing the multimedia multi-user collaboration application to meet a preset performance benchmark value, during the videoconference session, by adjusting a default A/V processing instruction module setting, in response to an information handling system user participation level detected by the sensor hub;
the processor to execute code instructions for a first A/V processing instruction module identified within the first optimized A/V processing instruction adjustment to adjust an image of the information handling system user in the locally captured video sample or a recording of the information handling system user in the locally captured audio sample for the videoconference session into a locally captured media sample, according to the optimized A/V processing instruction adjustment; and
a network interface device transmitting the locally captured media sample to the remotely located computing device participating in the videoconference session.

16. The information handling system of claim 15 further comprising:
the network interface receiving a remotely captured media sample from the remotely located computing device via the multimedia multi-user collaboration application;
the processor executing code instructions for the trained neural network to output a second optimized A/V processing instruction adjustment in response to a remotely located computing device user participation level measuring participation in the videoconference session by a remotely located computing device user;
the processor executing code instructions for a second A/V processing instruction module to transform the remotely captured media sample into a remotely captured audio sample and a remotely captured video sample pursuant to the second optimized A/V processing instruction adjustment;

the display screen displaying the remotely captured video sample; and the speaker playing the remotely captured audio sample.

17. The information handling system of claim 15, wherein the optimized A/V processing instruction adjustment adjusts selection of a compression algorithm for compressing the locally captured video sample or the locally captured audio sample, based on detected participation by the information handling system user.

18. The information handling system of claim 15, wherein the optimized A/V processing instruction adjustment adjusts the default A/V processing instruction module setting by removing an A/V processing instruction module to apply a virtual background to the locally captured video sample from a queue of A/V processing instruction modules set for execution, when participation by the information handling system user falls below a preset threshold participation level requirement.

19. The information handling system of claim 15, wherein the optimized A/V processing instruction adjustment adjusts a boundary detection algorithm of the video sample, when participation by the information handling system user falls below a preset threshold participation level requirement.

20. The information handling system of claim 15, wherein the optimized A/V processing instruction adjustment adjusts the default A/V processing instruction module setting by removing an A/V processing instruction module to reduce background noise within a locally captured audio sample from a queue of A/V processing instruction modules set for execution.

* * * * *